United States Patent
Wu et al.

(10) Patent No.: US 11,747,466 B2
(45) Date of Patent: Sep. 5, 2023

(54) SIDELINK RANGING WITH RECONFIGURABLE INTELLIGENT SURFACE-USER EQUIPMENT CO-LOCATION

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US); Anantharaman Balasubramanian, San Diego, CA (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/409,737

(22) Filed: Aug. 23, 2021

(65) Prior Publication Data
US 2023/0058156 A1    Feb. 23, 2023

(51) Int. Cl.
*G01S 13/87* (2006.01)
*G01S 13/76* (2006.01)
*G01S 7/00* (2006.01)

(52) U.S. Cl.
CPC ............ *G01S 13/876* (2013.01); *G01S 7/006* (2013.01); *G01S 13/765* (2013.01)

(58) Field of Classification Search
CPC ....... G01S 13/876; G01S 7/006; G01S 13/765
See application file for complete search history.

(56) References Cited

U.S. PATENT DOCUMENTS

| | | | |
|---|---|---|---|
| 2019/0052114 A1* | 2/2019 | Lee | H02J 50/80 |
| 2021/0302561 A1* | 9/2021 | Bayesteh | G01S 13/765 |
| 2022/0014935 A1* | 1/2022 | Haija | H04L 5/0048 |
| 2022/0353880 A1* | 11/2022 | Lee | H04W 72/542 |

* cited by examiner

*Primary Examiner* — Timothy A Brainard
*Assistant Examiner* — Juliana Cross
(74) *Attorney, Agent, or Firm* — Procopio, Cory, Hargreaves & Savitch LLP

(57) ABSTRACT

Aspects presented herein may enable a wireless device to perform an SL ranging based on a single-sided PRS transmission. In one aspect, a first wireless device transmits one or more reference signals to at least one RIS associated with a second wireless device. The first wireless device receives one or more reflected reference signals reflected from the at least one RIS. The first wireless device calculates a signal RTT based on the one or more reference signals and the one or more reflected reference signals. In another aspect, a second wireless device transmits, to a first wireless device, information indicating a time, a duration, or a periodicity in which at least one RIS associated with the second wireless device is to be activated. The second wireless device activate the at least one RIS based on the information.

30 Claims, 18 Drawing Sheets

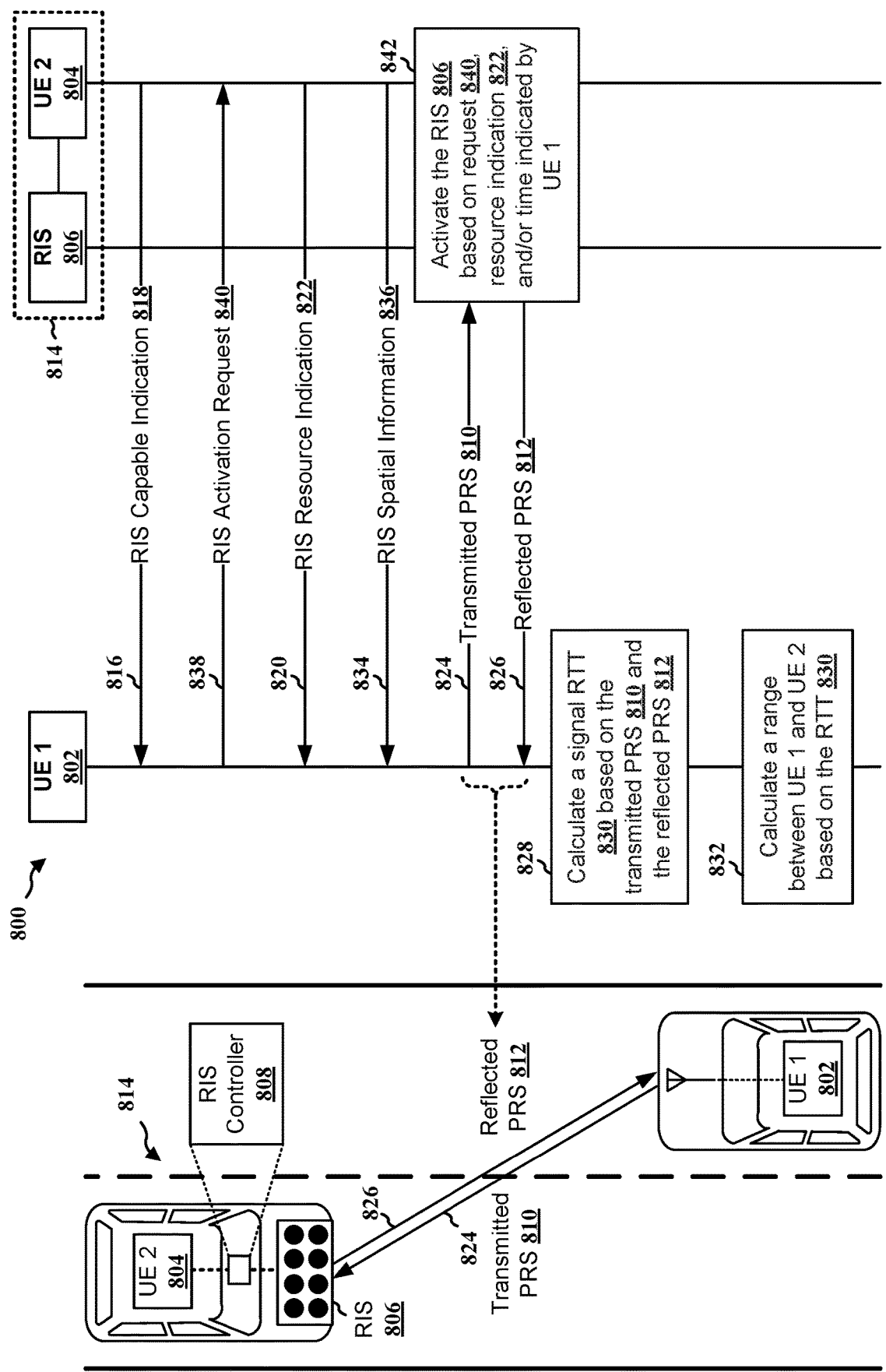

SIDELINK RANGING WITH RECONFIGURABLE INTELLIGENT SURFACE-USER EQUIPMENT CO-LOCATION

TECHNICAL FIELD

The present disclosure relates generally to communication systems, and more particularly, to wireless communication involving sidelink ranging.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits one or more reference signals to at least one reconfigurable intelligent surface (RIS) associated with a second wireless device. The apparatus receives one or more reflected reference signals reflected from the at least one RIS. The apparatus calculates a signal round-trip time (RTT) based on the one or more reference signals and the one or more reflected reference signals.

In an aspect of the disclosure, a method, a computer-readable medium, and an apparatus are provided at a second wireless device. The apparatus transmits, to a first wireless device, information indicating a time, a duration, or a periodicity in which at least one RIS associated with the second wireless device is to be activated. The apparatus activates the at least one RIS based on the information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a communication flow illustrating an example of an SL ranging based on a single-sided position reference signal (PRS) transmission and an RIS in accordance with various aspects of the present disclosure.

DETAILED DESCRIPTION

Figure 1:
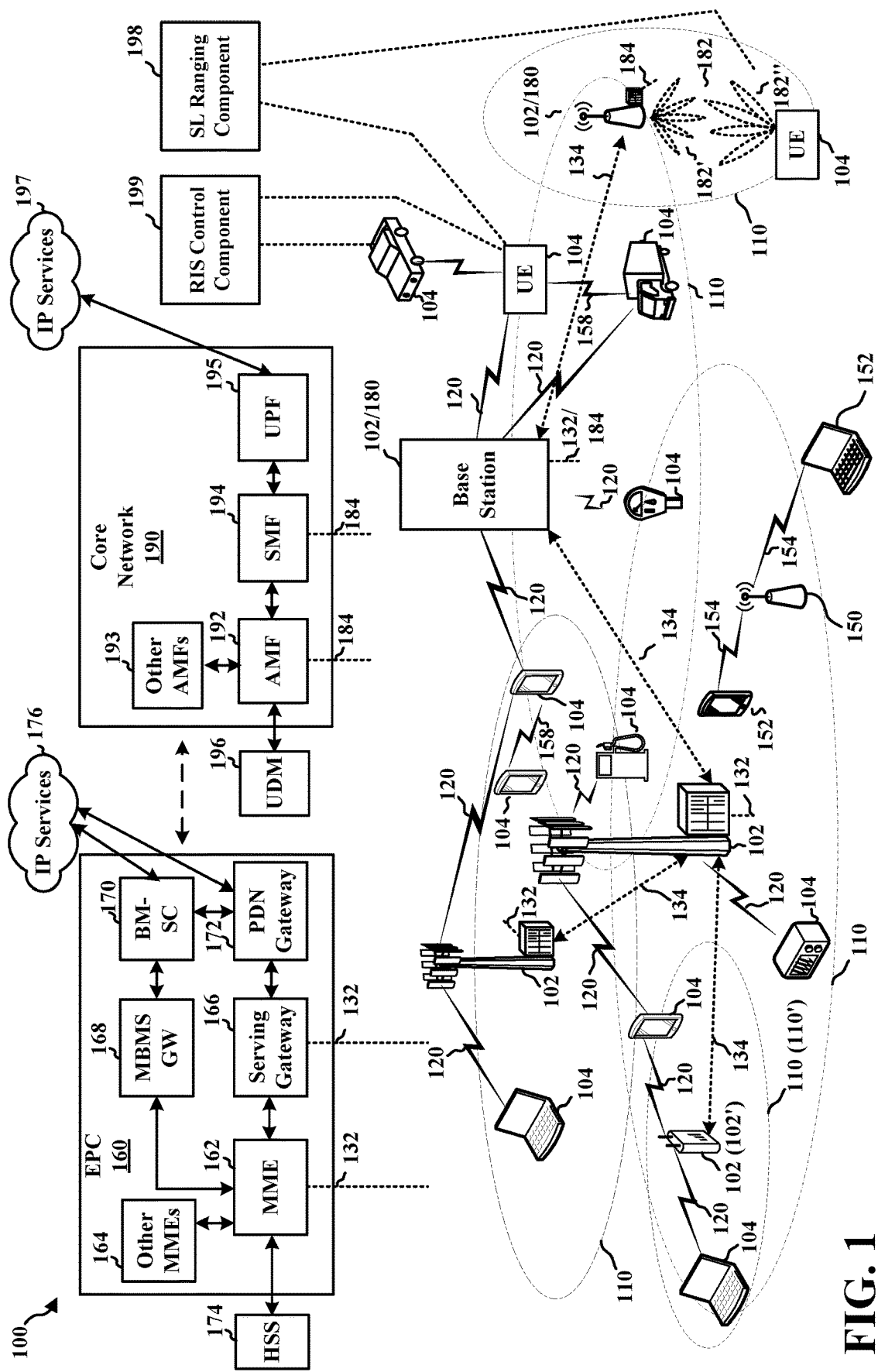
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented herein may improve the efficiency and performance of an SL-based ranging or positioning. Aspects presented herein may reduce the signaling overhead and the latency for an SL ranging or positioning that is based on calculating the RTT of transmitted/received PRSs. In one aspect of the represent disclosure, a distance between two UEs may be determined based on a single-sided PRS transmission. For example, a transmitting UE may perform an SL ranging or positioning with a receiving UE (or a target UE) that is associated with an RIS, where the transmitting UE may transmit one or more PRSs to the RIS of the receiving UE and the one or more PRSs may be reflected by the RIS. Then, the transmitting UE may calculate the distance between the transmitting UE and the receiving UE based on an RTT of the PRSs transmitted and the PRSs reflected.

In certain aspects, the UE 104 may include an SL ranging component 198 configured to perform an SL ranging based on a single-sided PRS transmission. In one configuration, the SL ranging component 198 may be configured to transmit one or more reference signals to at least one RIS associated with a second wireless device. In such configuration, the SL ranging component 198 may receive one or more reflected reference signals reflected from the at least one RIS. In such configuration, the SL ranging component 198 may calculate a signal RTT based on the one or more reference signals and the one or more reflected reference signals.

In certain aspects, the UE 104 may include an RIS control component 199 configured to control at least one RIS that is associated or co-located with the UE 104. In one configuration, the RIS control component 199 may be configured to transmit, to a first wireless device, information indicating a time, a duration, or a periodicity in which at least one RIS associated with the second wireless device is to be activated. In such configuration, the RIS control component 199 may activate the at least one RIS based on the information.

In certain aspects, the UE 104 may include both the SL ranging component 198 and the RIS control component 199. As such, the UE 104 may perform an SL ranging based on a single-sided PRS transmission, and the UE 104 may also control at least one RIS that is associated or co-located with the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
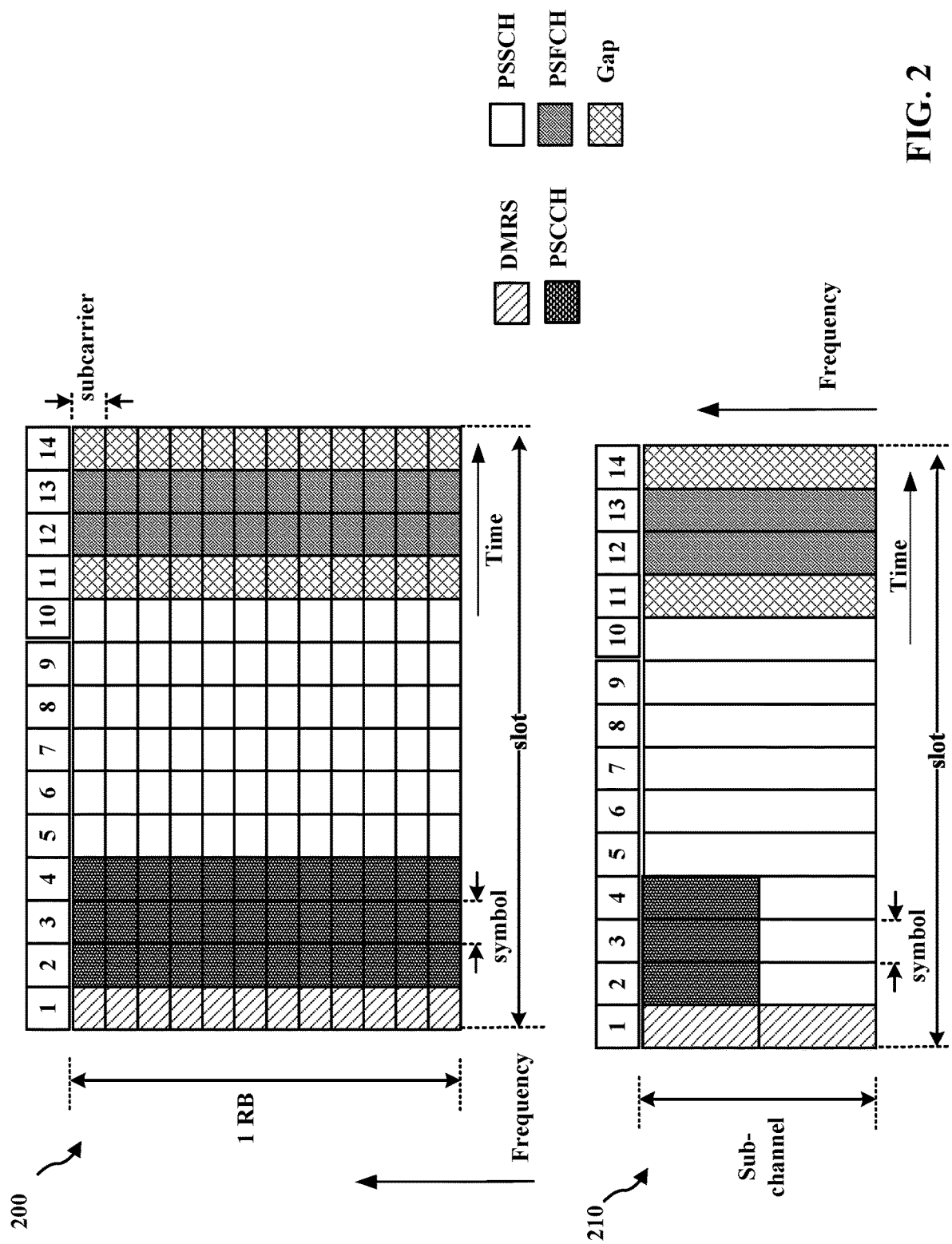
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
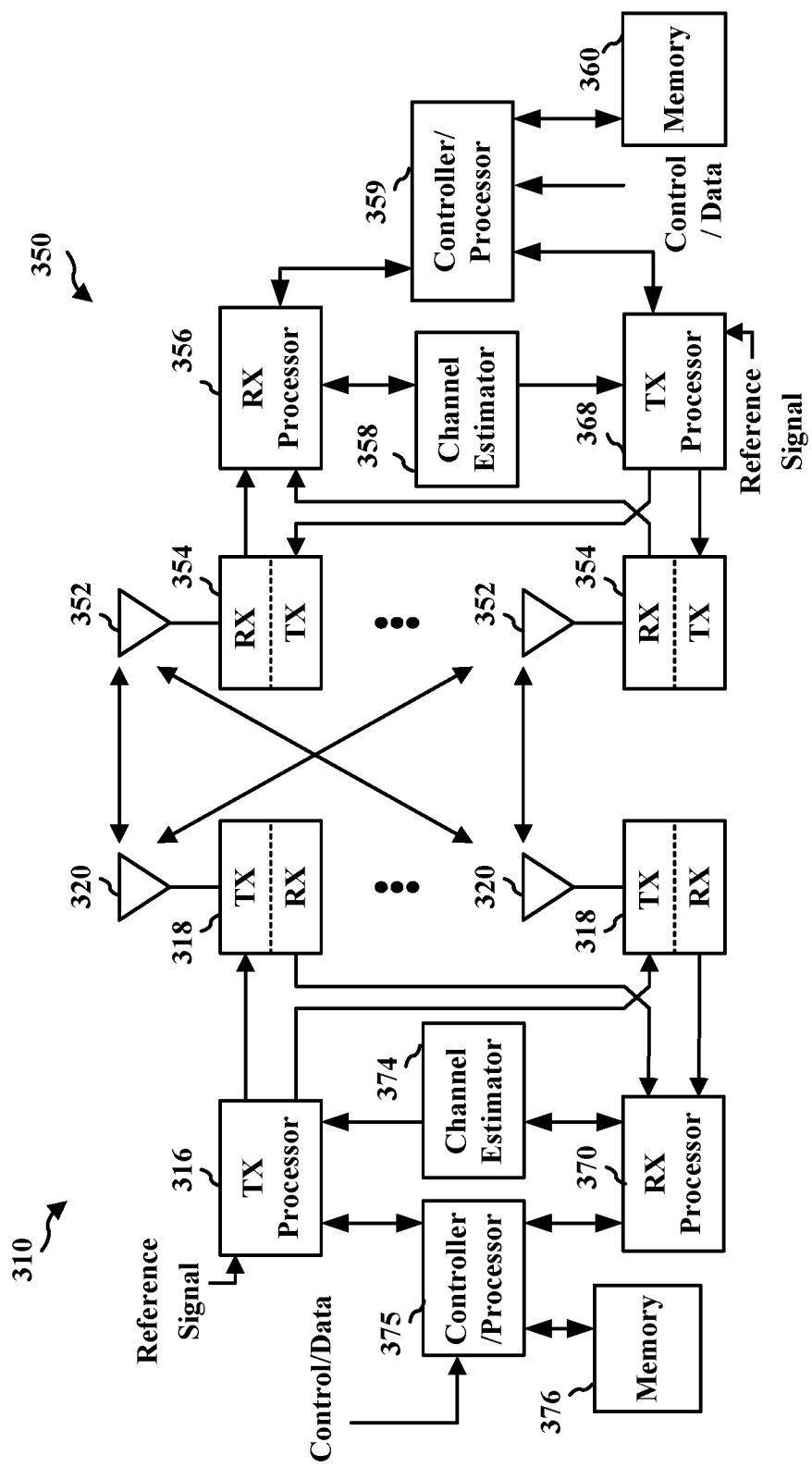
FIG. 3 is a diagram illustrating an example of a first device and a second device involved in wireless communication based, e.g., on sidelink.

FIG. 3 is a block diagram of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

Each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 provides demultiplexing between transport and logical channels, packet reassembly, deciphering, header decompression, and control signal processing to recover packets. The controller/processor 359 is also responsible for error detection using an ACK and/or NACK protocol to support HARQ operations.

Similar to the functionality described in connection with the DL transmission by the device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 may provide demultiplexing between transport and logical channels, packet reassembly, deciphering, header decompression, control signal processing to recover IP packets from the device 350. The controller/processor 375 may also be responsible for error detection using an ACK and/or NACK protocol to support HARQ operations.

In one example, at least one of the TX processor 368, the RX processor 356, and the controller/processor 359 may be configured to perform aspects in connection with the SL ranging component 198 of FIG. 1. In another example, at least one of the TX processor 368, the RX processor 356, and the controller/processor 359 may be configured to perform aspects in connection with the RIS control component 199 of FIG. 1. In another example, at least one of the TX processor 368, the RX processor 356, and the controller/processor 359 may be configured to perform aspects in connection with both the SL ranging component 198 and the RIS control component 199 of FIG. 1.

Figure 4:
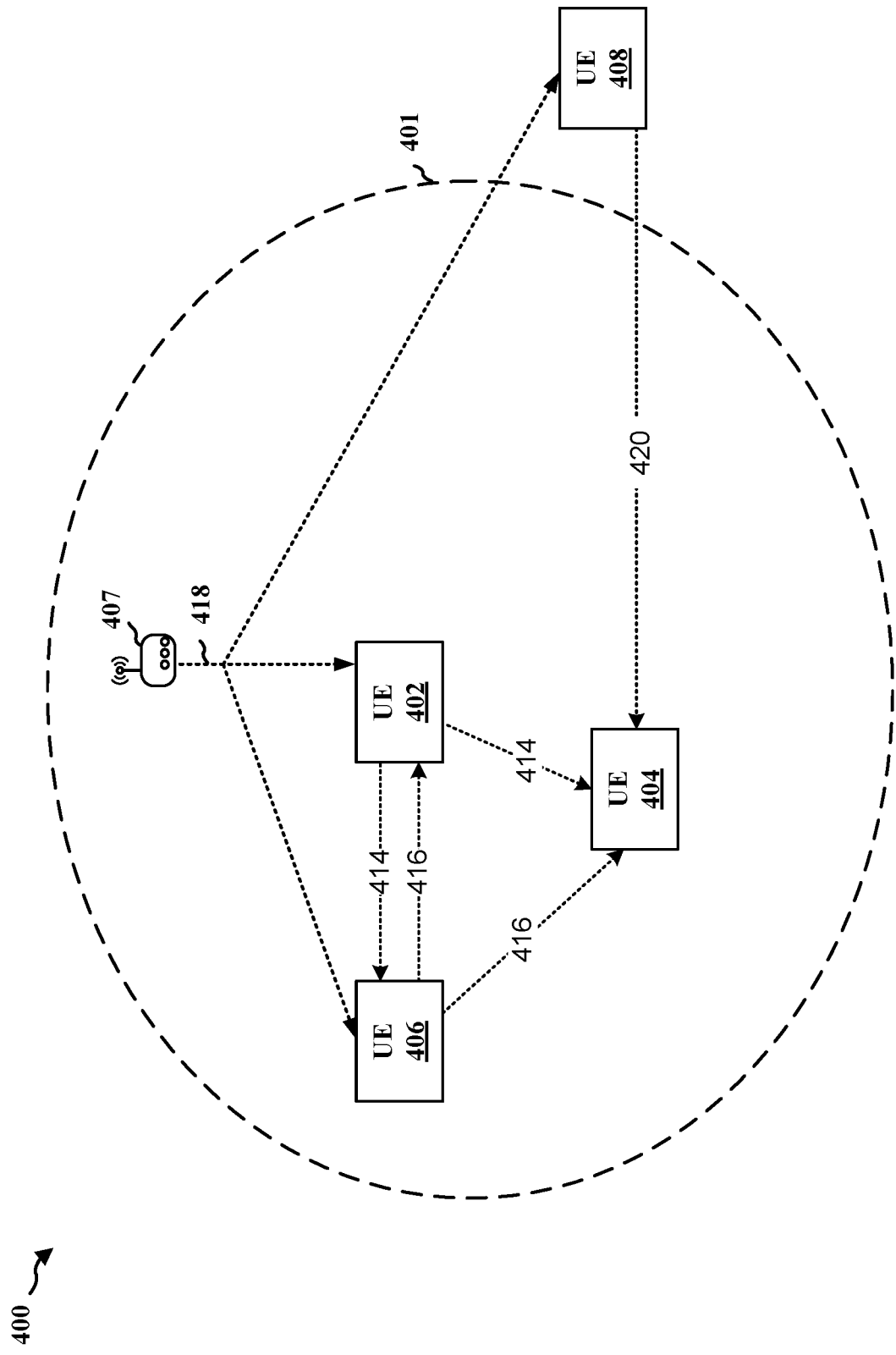
FIG. 4 is a diagram illustrating an example of wireless communication between devices based on sidelink communication in accordance with various aspects of the present disclosure.

FIG. 4 is a diagram 400 illustrating an example of wireless communication between devices based on sidelink communication. In one example, a UE 402 may transmit a transmission 414, e.g., including a control channel (e.g., a PSCCH) and/or a corresponding data channel (e.g., a PSSCH), that may be received by receiving UEs 404, 406. A control channel may include information for decoding a data channel and may also be used by a receiving device to avoid interference by refraining from transmitting on the occupied resources during a data transmission. The number of transmission time intervals (TTIs), as well as the RBs that will be occupied by the data transmission, may be indicated in a control message (e.g., a sidelink control information (SCI) message) from a transmitting device. The UEs 402, 404, 406, 408 may each have the capability to operate as a transmitting device in addition to operating as a receiving device. Thus, UEs 406, 408 are illustrated as transmitting the transmissions 416 and 420. The transmissions 414, 416, 420 may be broadcast or multicast to nearby devices. For example, the UE 402 may transmit communication (e.g., data) for receipt by other UEs within a range 401 of the UE 402. Additionally, or alternatively, the RSU 407 may receive communication from and/or transmit communication 418 to UEs 402, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1" or "sidelink Mode 1"), centralized resource allocation may be provided. For example, a base station 102 or 180 may determine resources for sidelink communication and may allocate resources to different UEs 104 to use for sidelink transmissions. In this first mode, a sidelink UE may receive the allocation of sidelink resources from the base station 102 or 180. In a second resource allocation mode (which may be referred to herein as "Mode 2" or "sidelink Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

A UE's position and/or a UE's range with respect to another UE may be determined/estimated based on sidelink (SL) communications. For example, two UEs may determine their locations (e.g., absolute locations) based on global navigation satellite system (GNSS), and the UEs may exchange their locations (e.g., their geographical longitude and latitude) with each other, such as via a V2X safety message. Thus, a UE may obtain, or otherwise determine, its location based on the GNSS and may broadcast, or otherwise transmit, information about its location in a sidelink message. As such, each of the surrounding UEs may be able to determine the location of the UE transmitting its location, and/or may determine a range between itself and the UE transmitting its location. If each of the UEs in the area transmit their respective location information, a UE may determine distances to the surrounding UEs relative to its location. In another example, UEs may determine their relative distance to another UE(s) and/or their absolute positions (e.g., geographical locations) based on reference signals transmitted and received between the UEs over sidelink, where such ranging or positioning technique may be referred to as an SL-based ranging or positioning. The distance between UEs may be monitored for various reasons. In some applications, such as V2X, the distance between UEs may be monitored as a part of avoiding collisions, improving road user safety, etc. The SL-based ranging or positioning may provide a UE with an alternative or additional ranging/positioning mechanism when positioning based on GNSS is attenuated or unavailable (e.g., when the UE is in a tunnel, an urban area, a canyon, or a sheltered place, etc.). For example, the SL-based ranging or positioning may be used by UEs for public safety use cases when network service and/or other positioning services are not available. In other examples, if the GNSS is available, the SL-based ranging or positioning may further be used by a positioning device in addition to a GNSS-based positioning to enhance the accuracy of the GNSS-based positioning.

In one example, an SL-based ranging or positioning for a UE may be accomplished based on a three-way handshake for a session establishment between the UE and one or more peer UEs, followed by exchanging of PRSs between the UE and the one or more peer UEs, and concluded by exchanging measurements based on PRS transmission and reception via messaging between the UE and the one or more peer UEs.

Figure 5:
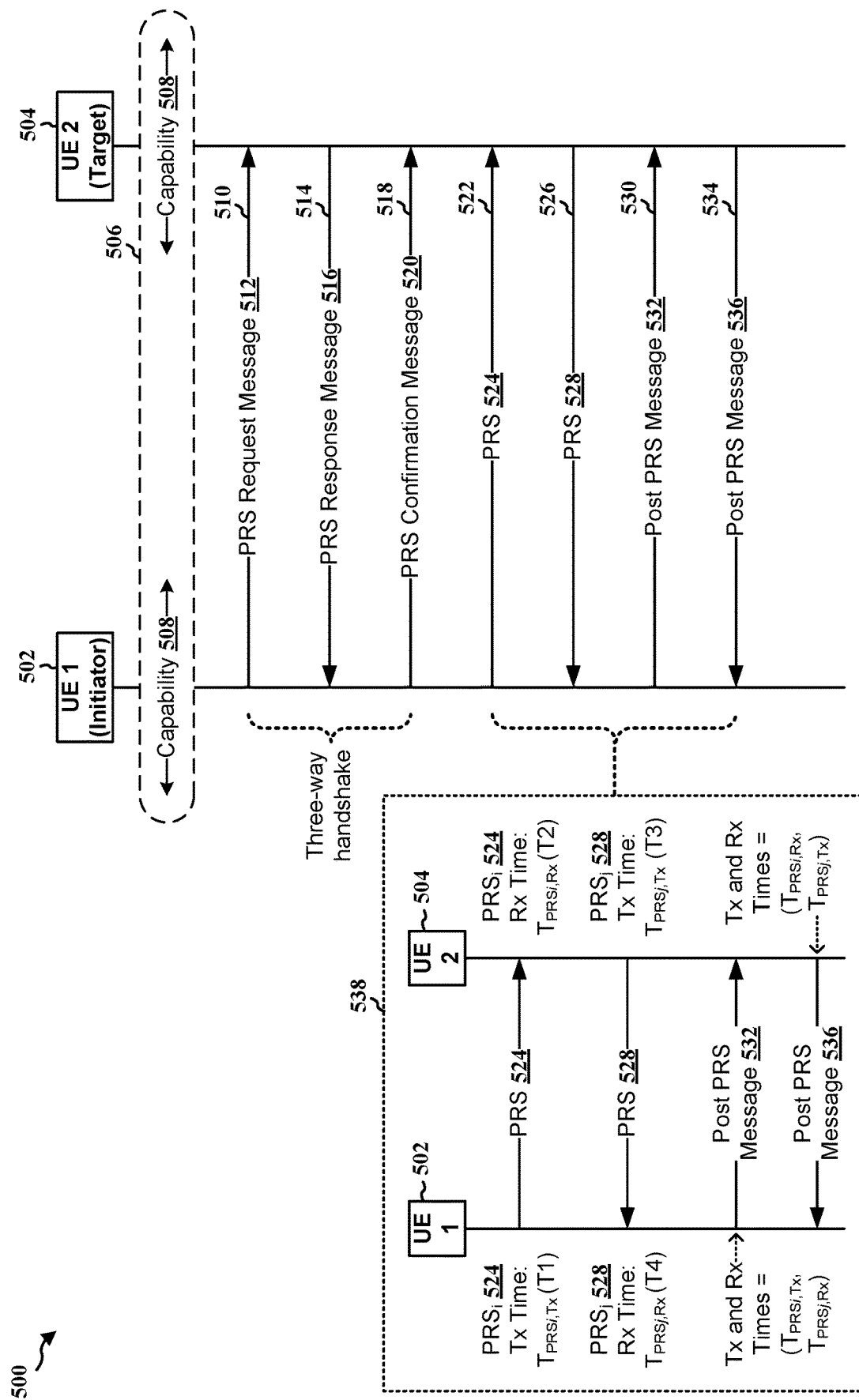
FIG. 5 is a communication flow illustrating an example of a sidelink (SL)-based ranging or positioning session between two UEs in accordance with various aspects of the present disclosure.

FIG. 5 is a communication flow 500 illustrating an example of an SL-based ranging or positioning session between two UEs in accordance with various aspects of the present disclosure. An SL ranging between a first UE 502 (e.g., an initiator) and a second UE 504 (e.g., a target) may be determined based at least in part on calculating an inter-UE round trip time (RTT) between positioning reference signals (PRSs) (e.g., wideband PRSs, SL PRSs, etc.) transmitted from the first UE 502 to the second UE 504 and the PRSs transmitted from the second UE 504 to the first UE 502. For example, based on the transmission (Tx) and reception (Rx) times of PRSs between the first UE 502 and the second UE 504, the first UE 502 and/or the second UE 504 may be able to determine the RTT between the transmitted PRSs and the received PRSs. Then, based on the RTT, the first UE 502 and/or the second UE 504 may determine a distance between the first UE 502 and the second UE 504.

In one example, as shown at 506, the first UE 502 and/or the second UE 504 may exchange a capability message 508 with each other, where the capability message 508 from the first UE 502 and/or the second UE 504 may include information related to each UE's capability to perform an SL-ranging/positioning. Based at least in part on the exchanged capability messages 508, the first UE 502 may determine whether the second UE 504 is a candidate for performing the SL-ranging/positioning.

After the capability message 508 exchanging, the first UE 502 may initiate an SL-ranging/positioning session with the second UE 504 by establishing a three (3)-way handshake with the second UE 504. For example, at 510, the first UE 502 may transmit a PRS request message 512 (e.g., PRS-request) to the second UE 504 for requesting the second UE 504 to transmit one or more PRSs to the first UE 502. At 514, in response to the PRS request message 512, the second UE 504 may transmit a PRS response message 516 to the first UE 502. For example, the PRS response message 516 may indicate whether the second UE 504 is able to grant the first UE 502's PRS request (e.g., the request for exchanging PRS). At 518, in response to the PRS response message 516, the first UE 502 may transmit a PRS confirmation message 520 to the second UE 504. For example, the PRS confirmation message 520 may confirm the PRS transmissions between the first UE 502 and the second UE 504. In other words, the three-way handshake initiated by the first UE 502 may include transmissions of the PRS request message 512, reception of the PRS response message 516, and transmission of the PRS confirmation message 520 at the first UE 502.

At 522, after the three-way handshake, the first UE 502 may transmit one or more PRSs 524 to the second UE 504. At 526, in response to the one or more PRSs 524, the second UE 504 may transmit one or more PRSs 528 to the first UE 502.

At 530, after receiving the one or more PRSs 526 from the second UE 504, the first UE 502 may measure the received one or more PRSs 526, such as the time in which the one or more PRSs 526 are received, and the first UE 502 may transmit information related to the measurement to the second UE 504 via a post PRS message 532. Similarly, at 534, the second UE 504 may measure the one or more PRSs 528, and the second UE 504 may transmit information related to the measurement to the first UE 502 via a post PRS message 536.

Based on a local measurement for the transmitted and the received PRSs (e.g., PRSs 524 and 528) and based on the measurement received from the other UE in the post PRS message (e.g., 532 or 536), the first UE 502 and/or the second UE 504 may be able to determine an RTT for the transmitted and the received PRSs.

In one example, as shown at 538, the first UE 502 and/or the second UE 504 may include two timestamps for the Tx time and the Rx time of the PRSs transmitted and received in its respective post PRS message. Then, the first UE 502 and/or the second UE 504 may determine the RTT for the PRSs transmitted and received based on the two timestamps received from the other UE. For example, the first UE 502 may include a transmission time for the one or more PRSs 524 (e.g., $T_{PRS_i,Tx}$, T1) and a reception time for the one or more PRSs 528 (e.g., $T_{PRS_i,Rx}$, T4) in the post PRS message 532, and the second UE 504 may include a reception time for the one or more PRSs 524 (e.g., $T_{PRS_j,Rx}$, T2) and a transmission time for the one or more PRSs 528 (e.g., $T_{PRS_j,Tx}$, T3) in the post PRS message 536. In other words, each UE may transmit its PRS Tx time and the Rx time for the PRS received from the peer UE in its post PRS message. Then, the RTT from the first UE 502 to the second UE 504 may be calculated by subtracting the respective Rx-Tx times of the PRSs for the first UE 502 and the second UE 504. For example, the RTT may be calculated based on the following equations:

$$RTT = \left(T_{PRS_i,Rx} - T_{PRS_i,Tx}\right) + \left(T_{PRS_j,Rx} - T_{PRS_j,Tx}\right),$$

$$RTT = \binom{PRS_i \text{ one way}}{\text{time of flight}} + \binom{PRS_j \text{ one way}}{\text{time of flight}}.$$

Then, a distance between the first UE 502 and the second UE 504 may be computed based on the calculated RTT. The SL-based ranging or positioning described herein may apply to two vehicle UEs (e.g., for calculating/estimating a distance between two vehicles), to a vehicle UE and a pedestrian UE (e.g., for calculating/estimating a distance a vehicle and a pedestrian), and/or to two mobile phones in general sidelink use cases (e.g., for calculating/estimating a distance between two mobile phone users), etc.

Figure 6:
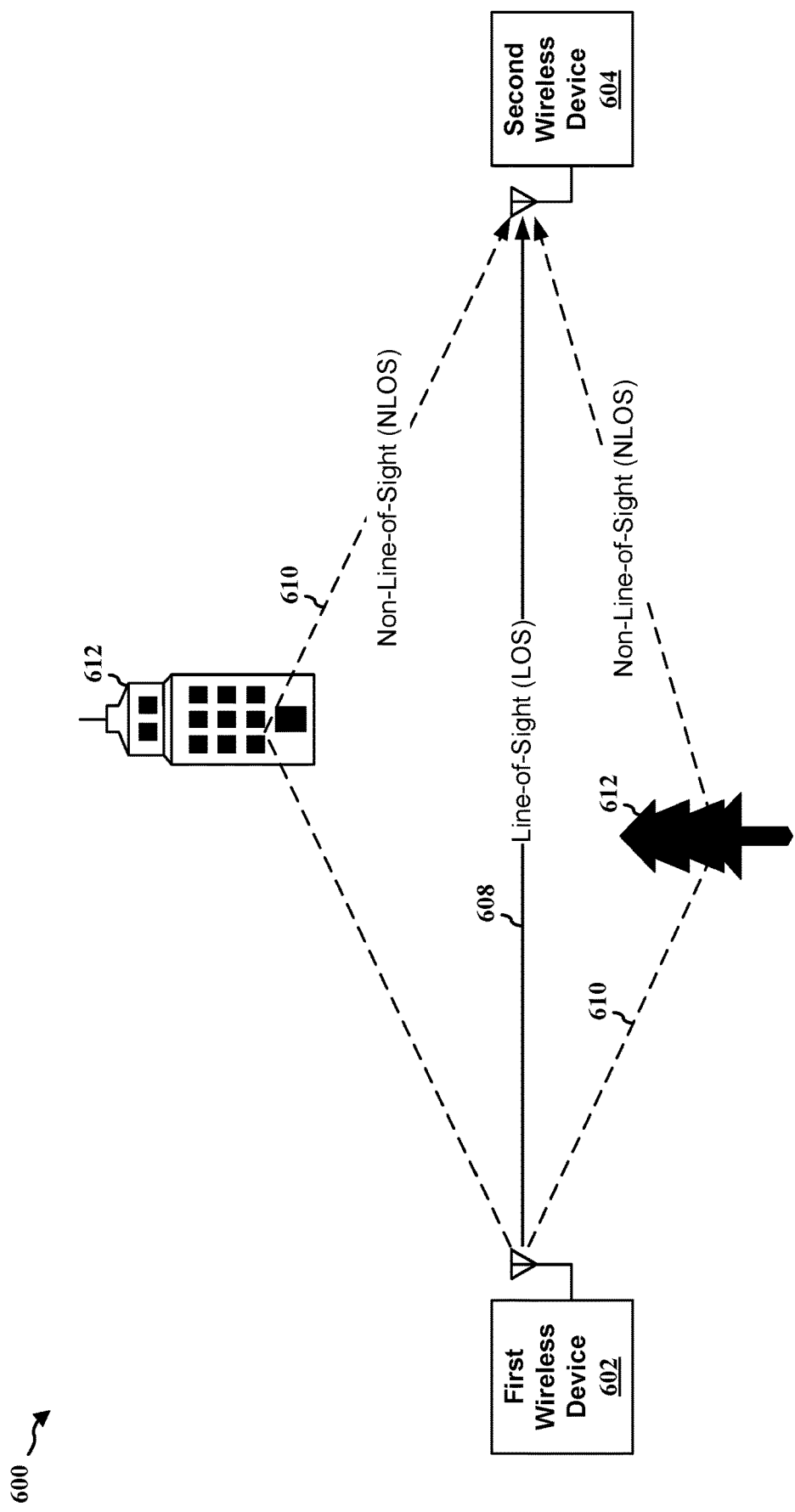
FIG. 6 is a diagram illustrating an example communication between wireless devices involving line-of-sight (LOS) and non-line-of-sight (NLOS) channels in accordance with various aspects of the present disclosure.

The accuracy of an SL-based ranging or positioning may be affected by whether UEs are in a line-of-sight (LOS) condition or in a non-line-of-sight (NLOS) condition with each other. FIG. 6 is a diagram 600 illustrating an example communication between wireless devices involving LOS and NLOS channels in accordance with various aspects of the present disclosure. A first wireless device 602 (e.g., a UE, a positioning reference device, a sidelink device, a base station, etc.) may be configured or scheduled to transmit data to a second wireless device 604 (e.g., a UE, a positioning reference device, a sidelink device, a base station, etc.). In some scenarios, as shown at 608, the data transmitted from the first wireless device 602 may reach the second wireless device 604 directly without being obstructed by obstacle(s). In other scenarios, as shown at 610, the data transmitted from first wireless device 602 may reach the second wireless device 604 indirectly via reflection, refraction, and/or penetration, etc. (e.g., one or more objects 612 may obstruct or may be within the transmission path of the data). As a signal traveling through an NLOS path/channel such as shown at 610 may reach the second wireless device 604 later and/or with a weaker power compared to a signal traveling through an LOS path/channel such as shown at 608 (e.g., a path/channel without obstructions), the RTT for signals travelling via an NLOS path/channel may also be longer. As such, a calculation or an estimation of a distance between the first wireless device 602 and the second wireless device 604 based on the RTT may not be accurate.

For purposes of the present disclosure, a signal/data transmission without being obstructed by obstacle(s) may be referred to as a "LOS transmission," a "LOS signal/data," a "signal/data transmitted via an LOS path/channel," etc., whereas a signal/data transmission that is obstructed by obstacle(s) may be referred to as an "NLOS transmission," an "NLOS signal/data," a "signal/data transmitted via an NLOS path/channel," etc., (e.g., signal/data transmission involving reflection, refraction, and/or penetration, etc.). Signal reflection may be referring to a signal transmitted from a transmitter (e.g., the first wireless device 602) in a signal/beam path that is bounced off from one or more objects (e.g., the objects 612) before reaching a receiver (e.g., the second wireless device 604). Signal refraction may refer to a signal that is transmitted from a transmitter in a signal/beam path and changes its direction as it passes through an obstacle (e.g., a material or a medium in which the signal is able to pass/penetrate through) before reaching a receiver. Signal penetration may refer to a signal that is transmitted from a transmitter in a signal/beam path and penetrates an object or medium before reaching a receiver.

Figure 7:
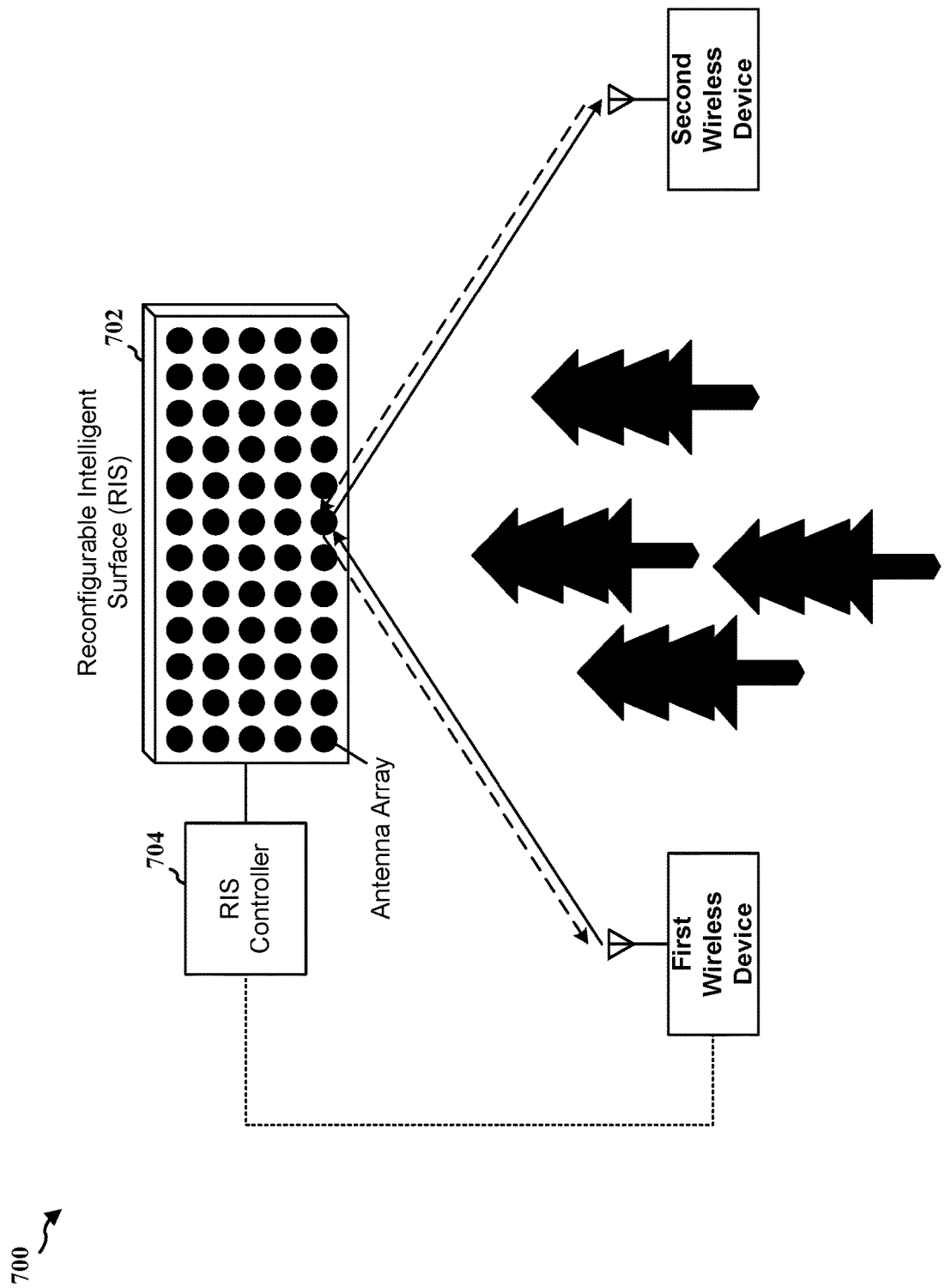
FIG. 7 is a diagram illustrating an example reconfigurable intelligent surface (RIS) in accordance with various aspects of the present disclosure.

To improve communication between wireless devices that are in an NLOS condition (or not in an LOS condition), a reconfigurable intelligent surface (RIS) (which may also be referred to as a "reflection intelligent surface") may be used by the wireless devices to assist their transmission/reception (or relaying) of signals. FIG. 7 is a diagram 700 illustrating an example reconfigurable intelligent surface in accordance with various aspects of the present disclosure. As shown at 702, an RIS may be a planar structure that is engineered/configured to have properties that enable a dynamic control of the electromagnetic waves. For example, an RIS may be a node that is capable of receiving a signal from a first wireless device (e.g., a transmitter) and then re-radiating or reflecting the signal to a second wireless device (e.g., a receiver) with controllable time-delays. An RIS may include a phased array without a transceiver, and an RIS may be designed based on an antenna or a metamaterial, where the RIS may be configured to reflect or re-radiate a signal to one or more directions. For example, a phase shifting control may be integrated with an antenna panel to control the phase shifting of the antenna panel. An RIS may include multiple small elements that are associated with different time-delays and thereby the RIS may be capable of synthesizing a scattering behavior of an arbitrarily-shaped object of the same size. This feature may, for instance, be used to beamform a signal towards a receiving wireless device.

In some examples, as shown at 704, an RIS may include an RIS controller and one or more antenna arrays, where the RIS controller may control the one or more antenna arrays to receive/reflect signal towards one or more directions. The RIS controller may be able to communicate with other nodes, e.g., a UE, a base station, an RSU, etc. For example, in a cellular network, a network node (e.g., a base station) may control an RIS, where the network node may determine/configure one or more parameters for the RIS, such as an activation/deactivation time, a phase, beam direction(s), and/or beamforming weights used by the RIS, etc. The base station may indicate the determined/configured parameters to one or more UEs, and a UE may use the RIS to assist its transmission and/or reception of signal with other UE(s) based at least in part on the determined/configured parameters. A communication link between the base station and the RIS may be wired or wireless. In some examples, an RIS may function as a UE (e.g., the RIS includes hardware components and/or functions of a UE). In other examples, an RIS may be co-located or associated with a UE, such that the RIS may communicate with a base station or another UE via the UE.

As an RIS may be capable of reflecting or re-radiating signals to a different direction, the RIS may be used by wireless devices to turn an NLOS path/channel to a path/channel that is close or similar to an LOS path/channel by reflecting/relaying signals transmitted between wireless devices. As such, wireless devices may use an RIS to improve their communication when the wireless devices are not in an LOS condition (e.g., the wireless devices are in an NLOS condition), where one wireless device may transmit signals to another wireless device via the RIS. The RIS may also be used by wireless devices to improve network coverage/throughput, and to reduce power consumption. For example, an RIS may be configured to reflect signals transmitted from a transmitting device toward a direction or an area that is not covered by the signals (e.g., a coverage hole, etc.) with less power compared to increasing the transmission power of the transmitting device. Similarly, an RIS may be used by wireless devices to improve the accuracy of an SL-based ranging or positioning. For example, as an NLOS path/channel may increase the RTT between PRSs transmitted to a receiving device and/or PRSs received from the receiving device, an RIS may enable the PRSs to be transmitted and/or received in a path/channel that is closer or similar to an LOS path/channel.

In some examples, an SL ranging or positioning based on transmission and reception of PRSs between multiple UEs may have a high signaling overhead. For example, as shown by the communication flow 500, at least two PRS transmissions (e.g., one in a forward link and one in a reverse link as shown at 522 and 526) may be configured between the first UE 502 and the second UE 504. In some scenarios, such configuration may be challenging for sidelink when UEs are performing an SL-based ranging or positioning in an autonomous mode (e.g., under the sidelink Mode 2 where sidelink transmissions between UEs are not scheduled by a base station) and the number of UEs is high. In other examples, an SL ranging or positioning based on transmission and reception of PRSs between multiple UEs may have a relatively high latency. For example, as two UEs may be configured to take turn to transmit/receive PRSs and to determine a distance between them based on the RTT of the transmitted/received PRSs, a UE's capability to process the received PRSs and/or to transmit the PRSs (e.g., in response to the received PRSs) may affect the latency of the RTT and/or the distance determination. For example, a UE with a lower capability may take a longer time to process received PRSs and/or to transmit PRSs compared to a UE with a higher capability. In some scenarios, latency may be an important criteria for a ranging or a positioning application. For example, latency specification for a ranging or positioning may be critical in some use cases such as V2X, where sub-meter level accuracy may be specified for autonomous driving (which may be more challenging when UEs are moving at a high speed).

Aspects presented herein may improve the efficiency and performance of an SL-based ranging or positioning. Aspects presented herein may reduce the signaling overhead and the latency for an SL ranging or positioning that is based on calculating the RTT of transmitted/received PRSs. In one aspect of the represent disclosure, a distance between two UEs may be determined based on a single-sided PRS transmission. For example, a first UE (e.g., a transmitting UE) may perform an SL ranging or positioning procedure with a second UE (e.g., a receiving UE, a target UE, etc.) that is associated with an RIS (e.g., the RIS may be in proximity, co-located with, or otherwise associated with the second UE or may be part of the second UE, etc.), where the first UE may transmit one or more PRSs to the RIS of the second UE and the one or more PRSs may be reflected by the RIS of the second UE. For example, the RIS may be co-located with the second UE, where the second UE may be a vehicle UE capable of performing sidelink communication, such as V2X, (e.g., the second UE is equipped with the RIS). In other examples, the RIS itself may be capable of performing sidelink communication (e.g., the RIS has sidelink capabilities integrated), thus the second UE may be the RIS. In other examples, the second UE may be an RSU, such that the RIS may be stationary.

After transmitting one or more PRSs to the RIS associated with the second UE, the first UE may calculate an RTT between the one or more PRSs transmitted to the RIS and the one or more PRSs reflected from the RIS, and the first UE may determine a distance between the first UE and the second UE based on the calculated RTT. In other words, as one or more PRSs transmitted by the first UE may be reflected by the RIS associated/co-located with the second UE, the first UE (which may be a full duplex capable UE) may also receive the reflected one or more PRSs from the RIS. As such, the first UE may determine a signal RTT between the first UE and the second UE based on a single-sided PRS transmission (e.g., based on the PRS transmission timing and timing of arrival (ToA) of the reflected PRS signal), and the distance between the first UE and the second UE may then be calculated based on the determined RTT. The single-sided PRS transmission disclosed herein may reduce the PRS signaling overhead between UEs. In addition, the latency for the SL-based ranging or positioning may also be reduced (e.g., shortened) by the single-sided (one-shot) PRS transmission as a UE (e.g., the first UE) may perform a ranging or positioning with a target UE (e.g., the second UE) independent of the target UE's capability (e.g., PRS transmission/reception processing capability).

FIG. 8 is a communication flow 800 illustrating an example of an SL ranging based on a single-sided PRS transmission and an RIS in accordance with various aspects of the present disclosure. The numberings associated with the communication flow 800 do not specify a particular temporal order and are merely used as references for the communication flow 800.

At shown at 814, a second UE 804 may be associated with at least one RIS 806. In one example, the second UE 804 may be a vehicle UE capable of performing sidelink/V2X communication, and the RIS 806 may be co-located with the vehicle UE. Although the example in FIG. 8 is illustrated for a vehicle application, the concepts may similarly be applied for other UEs that are not associated with a vehicle. In FIG. 8, the vehicle UE may control the RIS 806 (e.g., activate the RIS, de-activate the RIS, change parameters associated with the RIS, etc.) via an RIS controller 808. For example, a vehicle UE that is associated with the RIS 806 may be a vehicle having a V2X module with a passive RIS panel mounted on the vehicle. In another example, the RIS 806 may be integrated with the second UE 804, such that the second UE 804 and the RIS 806 may be the same entity (e.g., the RIS 806 is capable of performing sidelink/V2X communication or the second UE 804 is equipped with the RIS 806, etc.). In another example, the second UE 804 may be an RSU or a stationary device, such that the RIS 806 may be at a fixed location.

At 816, the second UE 804 may transmit/broadcast an RIS capable indication 818 to one or more UEs (e.g., UEs within its transmission range), where the RIS capable indication 818 may indicate that the second UE 804 is a RIS-capable UE (e.g., has the capability to provide RIS) or the second UE 804 is co-located with at least one RIS (e.g., the RIS 806).

At 820, the second UE 804 may transmit/broadcast an RIS resource indication 822 to one or more UEs, where the RIS resource indication 822 may indicate one or more resources (e.g., slots) that the RIS 806 will be activated or turned on (e.g., the RIS 806 will be activated to reflect signal(s) in those resources). For example, the RIS resource indication 822 may indicate a time in which the RIS 806 will be activated (e.g., from 09:10:00 to 09:10:02, or at slots #1, 3, 5, 7 of a frame, etc.), a duration in which the RIS 806 will be activated (e.g., for ten slots after a triggering event or a specified time), and/or a periodicity in which the RIS 806 will be activated (e.g., every two or four slots, etc.). In some examples, the RIS capable indication 818 and the RIS resource indication 822 may be the same indication, e.g., the RIS resource indication 822 may implicitly indicate that the second UE is a RIS-capable UE. In other examples, the RIS capable indication 818 and the RIS resource indication 822 may be separate indications. Then, as shown at 842, the second UE 804 may activate the RIS 806 based on the RIS resource indication 822 (or based on an RIS activation request 840 or a time indicated by the first UE 802 described below).

At 824, a first UE 802 may transmit one or more PRSs to the RIS 806 (or toward the second UE 804). For example, in response to the RIS capable indication 818 and/or the RIS resource indication 822, the first UE 802 may transmit a PRS 810 (may refer to as the "transmitted PRS 810" hereafter) during the resources (e.g., slots) in which the RIS 806 is activated. In some examples, the first UE 802 may be a UE (e.g., a vehicle UE) that is capable of performing a full duplex communication, where the first UE 802 may transmit and receive data at the same time (e.g., performing bi-directional network data transmissions at the same time). For example, the first UE 802 may have a large antenna panel or multiple transmit-receive points (TRP) equipped for the full-duplex communication. As such, the first UE 802 may transmit and receive signals (e.g., PRSs) at the same time.

At 826, the first UE 802 may receive one or more PRSs that are reflected/re-radiated from the RIS 806. For example, after the transmitted PRS 810 reaches the RIS 806, the RIS 806 may reflect the transmitted PRS 810, and the PRS(s) reflected (may refer to as the "reflected PRS 812" hereafter) may be received by the first UE 802. After receiving the reflected PRS 812, the first UE 802 may determine a time of arrival (ToA) for the reflected PRS 812.

At 828, the first UE 802 may calculate an RTT 830 for the transmitted PRS 810 and the received PRS 812. For example, the RTT 830 may be calculated from the time the first UE 802 starts to transmit the transmitted PRS 810 to the time the first UE 802 detects/receives the reflected PRS 812 from the RIS 806.

At 832, the first UE 802 may calculate or estimate a range between the first UE 802 and the second UE 804 based on the RTT 830. For example, the range may be calculated or estimated based on the traveling speed and time of the transmitted PRS 810 and the reflected PRS 812.

Figure 9B:
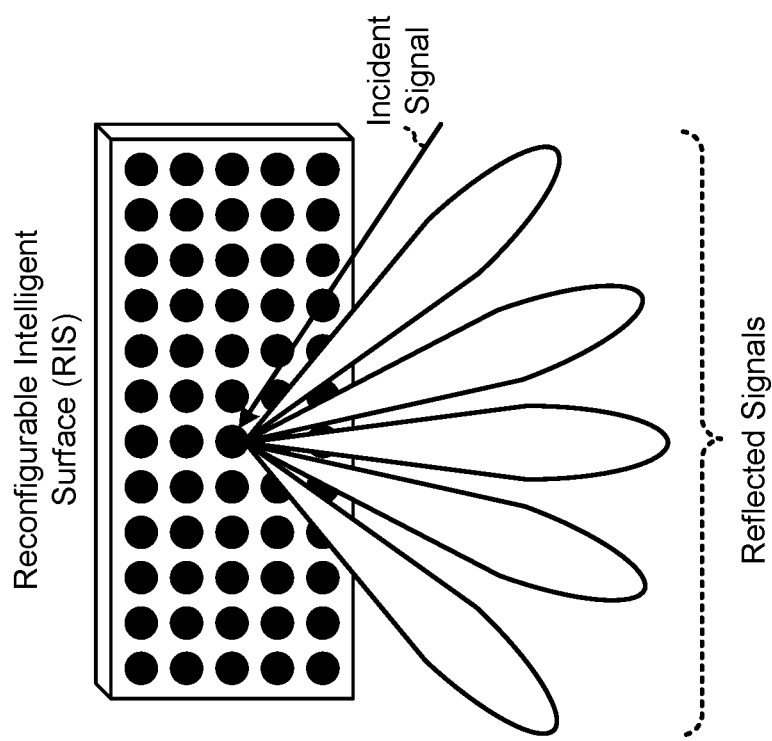
FIGS. 9A and 9B are diagrams illustrating examples of RIS reflected signals in accordance with various aspects of the present disclosure.
Figure 9A:
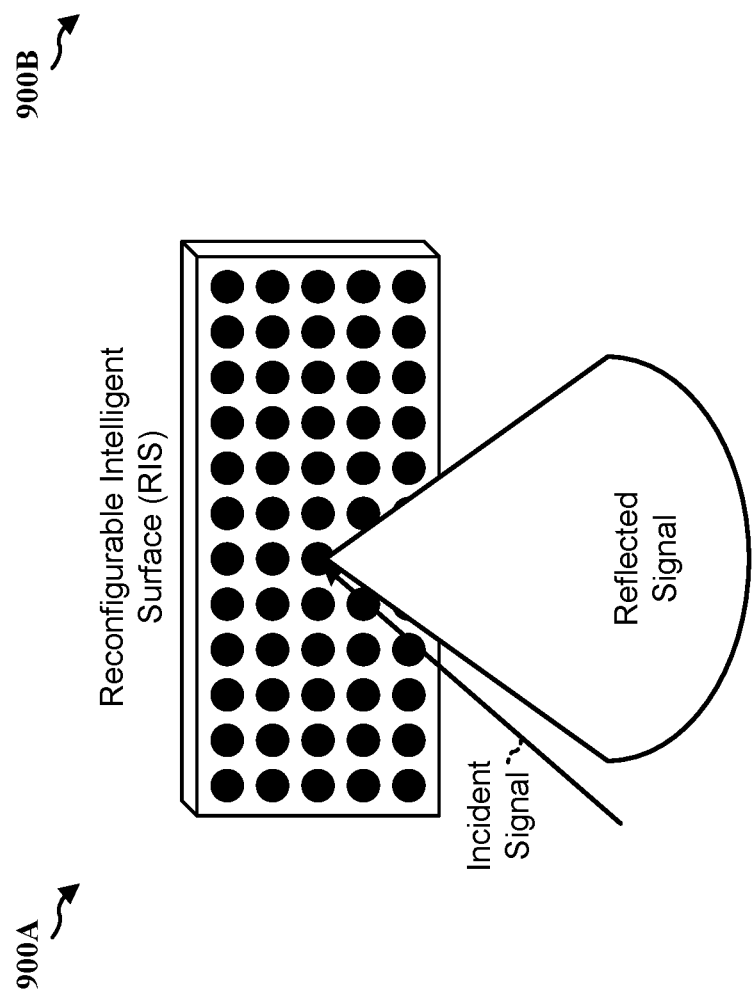

In one example, the RIS 806 may be configured (e.g., by the second UE 804 via the RIS controller 808) to operate in a (semi-)static manner. For example, under the (semi-)static manner, the precoding weights (or beam direction(s)) for incident (e.g., received) signal(s) and/or reflected signal(s) may remain the same across multiple reflection instances, where a reflection instance may refer to a time duration (e.g., one slot) for RIS operation (e.g., a duration in which the RIS 806 is activated). In other words, there may be no dynamic change of precoding weights and/or beam direction(s) for incident and/or reflected signal(s) across multiple reflection instances. In one example, as shown by diagrams 900A and 900B of FIGS. 9A and 9B, the RIS 806 may be configured to reflect a received signal (e.g., an incident signal) in a larger angle range (e.g., the signal reflected by the RIS 806 covers a wide angle range). For example, as shown by the diagram 900A, the reflected signal may be a wide beam (compared to the incident signal) that covers a wide angle range. Alternatively, as shown by the diagram 900B, the reflected signal may include multiple concurrent narrower beams pointing to different directions. As such, the second UE 804 may operate the RIS 806 in a (semi-)static manner as the precoding weights and/or beam direction for the RIS 806 or for an RIS operation may not be adjusted over a period time. In another example, the RIS 806 may not be associated with different precoding weights and/or beam direction(s), where the RIS 806 may be configured to reflect signal in a fixed angle and/or range when it is activated, and the RIS 806 may not reflect signal when it is inactivated (e.g., a simpler implementation without dynamic precoding weights adjustment).

In another example, the RIS 806 may be configured (e.g., by the second UE 804 via the RIS controller 808) to operate in a dynamic manner. Under the dynamic manner, the incident beam direction (e.g., direction for receiving a signal/beam) and/or the reflected beam direction (e.g., direction for reflecting/re-radiating a signal/beam) may be adjusted by the second UE 804 dynamically. For example, as shown by a diagram 1000 of FIG. 10, in each reflection instance, the reflected signal may be configured to cover a smaller angle range that is different from a previous and/or a subsequent reflection instance. As such, different precoding weights (e.g., for phase shift) may be applied to the RIS 806 across multiple reflection instances. In other words, the second UE 804 may vary the precoding weights and/or the beam direction(s) across different or multiple reflection instances to dynamically adjust the beam directions and/or beam weights for the incident and/or the reflected signal.

In one example, referring back to FIG. 8, if the RIS 806 is configured to operate dynamically (e.g., reflecting signals to different directions at different reflection instances), the second UE 804 may indicate spatial information associated with the RIS 806 to the first UE 802. For example, at 836, the second UE 804 may indicate RIS spatial information 836 to the first UE 802. In one example, the RIS spatial information 836 may include precoding weights and/or beam direction(s) for incoming incident signal when the co-located/associated RIS (e.g., the RIS 806) is activated (e.g., the angle of arrival (AoA) for incident signals), and/or the RIS spatial information 836 may include precoding weights and/or beam direction(s) for outgoing reflected signal when the co-located/associated RIS is activated (e.g., the angle of departure (AoD) for reflected signals), etc. For example, as shown by the FIG. 10, multiple reflection instances (e.g., slots in which the RIS 806 will be activated) may be associated with different incident and/or reflected signal beam directions (or precoding matrix/weights). Thus, the second UE 804 may indicate the beam directions and/or the spatial information associated with the RIS 806 for the multiple reflection instances in its sidelink transmission (e.g., via the RIS spatial information 836), where the sidelink transmission may be a unicast or a broadcast message.

Figure 11:
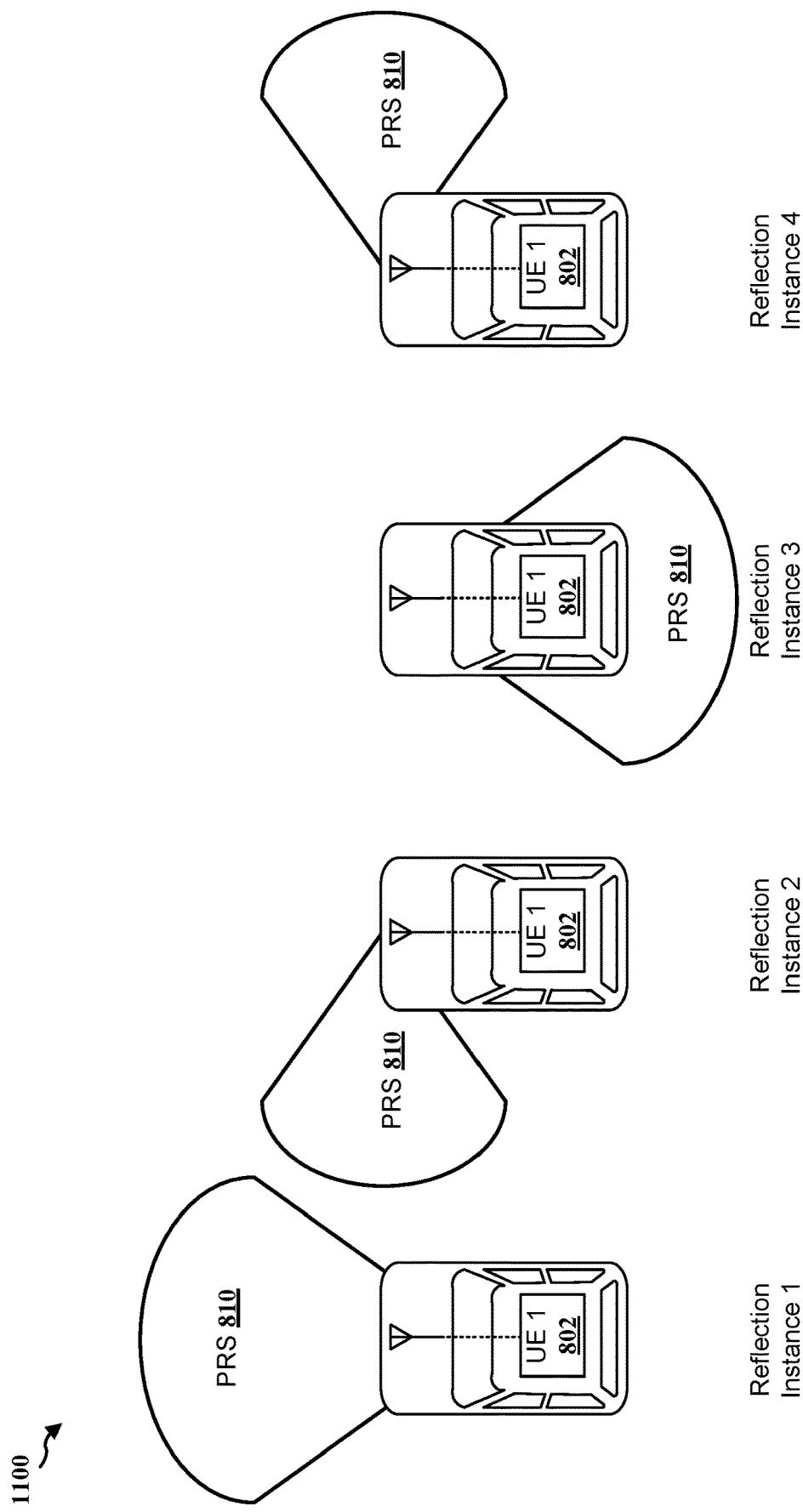
FIG. 11 is a diagram illustrating an example of a UE transmitting PRSs in different directions for different reflection instances in accordance with various aspects of the present disclosure.

In another example, at 824, the first UE 802 may transmit the PRS 810 in one or multiple of the reflection instances. For example, as shown by a diagram 1100 of FIG. 11, the first UE 802 may be configured to transmit the PRS 810 in a set of reflection instances (e.g., reflection instances 1, 2, 3, and 4) that covers multiple beam directions. For example, the first UE 802 may transmit the PRS 810 towards a first direction (e.g., to the front of the first UE 802) at a first RIS reflection instance, the first UE 802 may transmit the PRS 810 towards a second direction (e.g., to the left of the first UE 802) at a second RIS reflection instance, the first UE 802 may transmit the PRS 810 towards a third direction (e.g., to the rear of the first UE 802) at a third RIS reflection instance, and the first UE 802 may transmit the PRS 810 towards a fourth direction (e.g., to the right of the first UE 802) at a fourth RIS reflection instance, etc. Although the example in FIG. 11 is illustrated for a vehicle application, the concepts may similarly be applied for other UEs that are not associated with a vehicle.

Figure 12:
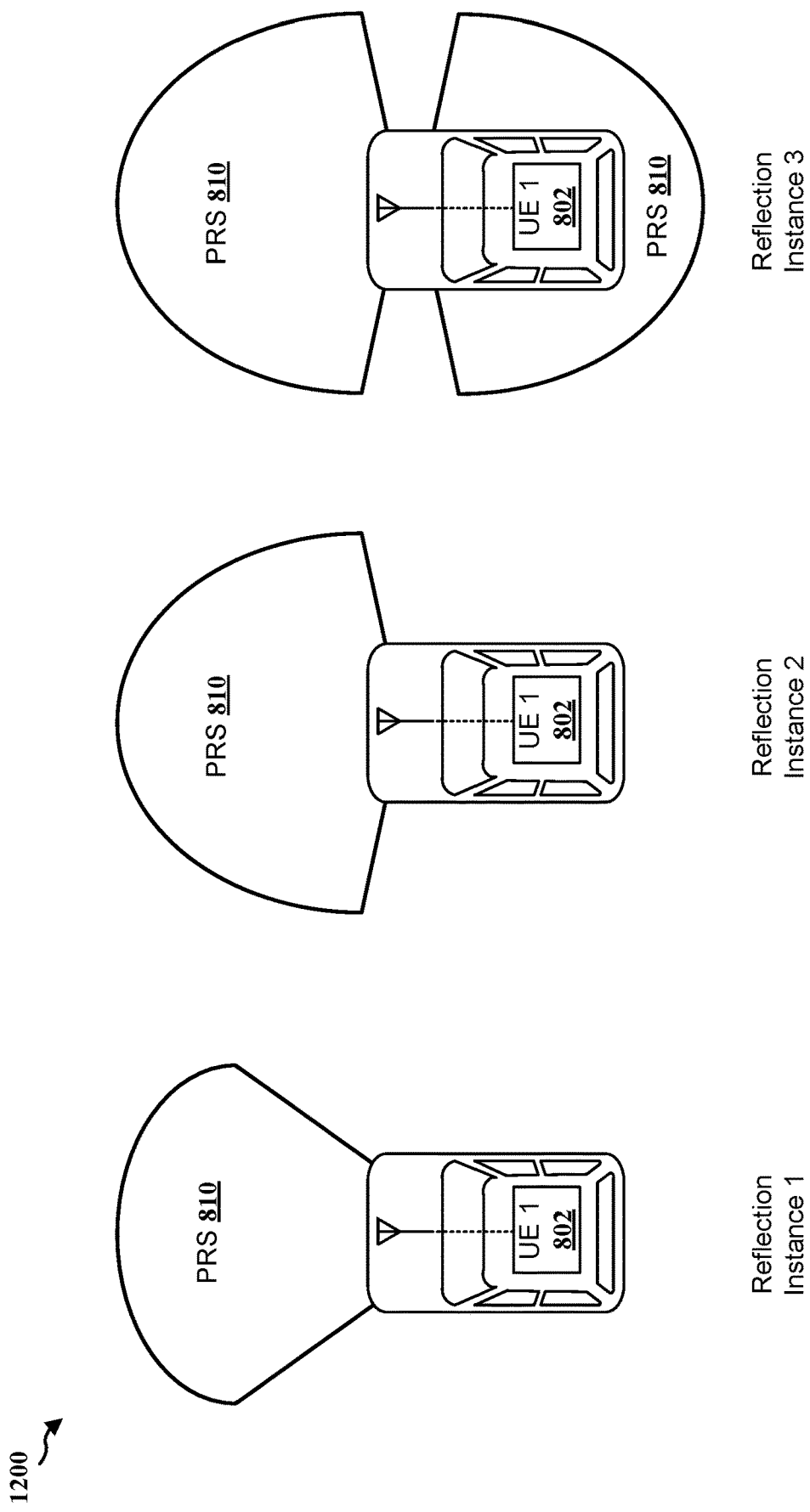
FIG. 12 is a diagram illustrating an example of a UE transmitting PRSs in different angles for different reflection instances in accordance with various aspects of the present disclosure.

In another example, as shown by a diagram 1200 of FIG. 12, the first UE 802 may be configured to transmit the PRS 810 in a set of reflection instances (e.g., reflection instances 1, 2, and 3) that covers a range of beam directions/angles. For example, the first UE 802 may transmit the PRS 810 covering 120 degrees at a first RIS reflection instance, the first UE 802 may transmit the PRS 810 covering 180 degrees at a second RIS reflection instance, and the first UE 802 may transmit the PRS 810 covering 360 degrees at a third RIS reflection instance, etc. In some examples, reflection instance(s) that coincides with AoA and/or AoD of the first UE 802's PRS signal (e.g., the PRS 810) may enable the first UE 802 to perform a better and a more accurate RTT measurement. In another example, the first UE 802 may determine one reflection instance, and the first UE 802 may transmit the PRS 810 in that reflection instance based on an incident and/or reflected signal direction, e.g., the incident and/or the reflected signal direction may be determined by the first UE 802 based on the RIS spatial information 836. Although the example in FIG. 12 is illustrated for a vehicle application, the concepts may similarly be applied for other UEs that are not associated with a vehicle.

Referring back to FIG. 8, in some examples, at 816, 820 and/or 834, the second UE 804 may transmit the RIS capable indication 818, the RIS resource indication 822, and/or the RIS spatial information 836 via a sidelink broadcast message. In other words, the second UE 804 may transmit a sidelink transmission in broadcast manner, where the sidelink transmission may carry one or multiple of its RIS capability/co-location, time resources that RIS is activated, and/or spatial information (e.g., beam directions) that is associated with the RIS on resources.

In another aspect of the present disclosure, the RIS 806 may operate based on a request (e.g., the RIS operation may be on-demand). For example, referring back to FIG. 8, at 838, the first UE 838 may transmit/broadcast an RIS activation request 840 to one or more UEs, which may include the second UE 804. If the second UE 804 receives the RIS activation request 840, the second UE 804 may transmit/ broadcast (via a sidelink message) at least one of the RIS capable indication 818, the RIS resource indication 822, and/or the RIS spatial information 836 in response to the RIS activation request 840. As such, at least some of the indications associated with the RIS 806 may be transmitted from the second UE 804 upon request. For example, the second UE 804 may transmit (e.g., unicast) or broadcast the RIS capable indication 818 (e.g., the RIS capability or co-location), and the RIS capable indication 818 may be received by the first UE 802. In response, if the first UE 802 is configured to perform a ranging with the second UE 804, the first UE 802 may send the RIS activation request 840 (e.g., an RIS-assisted ranging request) to the second UE 804. Then, in response to the RIS activation request 840, the second UE 804 may indicate (e.g., via the RIS resource indication 822) and/or reserve resource for PRS transmission from the first UE 802 (e.g., during which the RIS 806 is activated). Then, as shown at 842, the second UE 804 may activate the RIS 806 based on the RIS activation request 840.

In another example, the first UE 802 may determine time resource(s) in which its PRS transmission(s) (e.g., the transmission of the PRS 810) will take place, and the first UE 802 may indicate the determined time resource(s) to the second UE 804, such as via the RIS activation request 840 or another indication message. In response, as shown at 842, the second UE 804 may activate (e.g., turn on) the RIS 806 based on the time resource(s) indicated by the first UE 802. For example, if the first UE 802 indicates to the second UE 804 that the PRS 810 is to be transmitted at a third slot of a frame, the second UE 804 may activate the RIS 806 at the third slot of the frame.

In some scenarios, when the first UE 802 is transmitting PRS (e.g., the PRS 810), the first UE 802 may also receive some clutter echo. For example, the PRS 810 may be reflected back by other various obstacles (e.g., trees, other vehicles, etc.). In some cases, the clutter reflections may not be strong enough to disturb/effect the first UE 802's detection or reception of PRS reflection from the RIS 806 (e.g., the detection for the reflected PRS 812). In other cases, the clutter reflections may be strong enough to disturb/effect the first UE 802's detection or reception of PRS reflection from the RIS 806. In other words, it may still be possible that sometimes such clutter echo may cause a false alarm at the first UE 802, e.g., the first UE 802 may be confused by the clutter echo received from another object and may determine that the clutter echo is the PRS reflected from the RIS 806.

In one aspect of the present disclosure, to avoid or to reduce the clutter echo, the first UE 802 may be configured to perform the single-sided PRS ranging when there is an LOS from the second UE 804 (e.g., the first UE 802 and the second UE 804 are in an LOS condition), and the first UE 802 may not perform or may skip performing the single-sided PRS ranging when there is no LOS from the second UE 804 (e.g., the first UE 802 and the second UE 804 are in an NLOS condition). In one example, the first UE 802 may determine whether there is an LOS between the first UE 802 and the second UE 804 based on an external input, such as an input from sensor(s). In another example, the first UE 802 may be able to determine whether one or more signal/beam paths between the first UE 802 and the second UE 804 are likely to be LOS paths or NLOS paths based on the shape or statistical properties of channel impulse responses (CIRs) derived from signals transmitted and/or received via the one or more signal/beam paths, such as based on a confidence matrix, a delay spread, a power delay profile, and/or a narrowband factor associated with the one or more signal/ beam paths.

In another example, to avoid or to reduce the clutter echo, the first UE 802 may be configured to detect and receive the reflected PRS 812 from a strongest reflected path, which may likely be the first reflected path from the RIS 806. Alternatively, or additionally, as clutter reflections may tend to have smaller/lower power, the first UE 802 may be configured to detect a first path (e.g., a first tap) that has a CIR magnitude greater than a threshold.

In another example, to avoid or to reduce the clutter echo, the first UE 802 may be configured to transmit the PRS 810 twice (e.g., via two PRS transmissions). For example, the first UE 802 may transmit a first PRS 810 when the RIS 806 is not activated (e.g., the RIS 806 is not reflecting signals) in a first PRS transmission so that the first UE 802 may measure clutter echo from its PRS transmission. Then, the first UE 802 may transmit a second PRS 810 when the RIS 806 is activated in a second PRS transmission, where the first UE 802 may detect the RIS reflected PRS 812 with the measured clutter echo taken into consideration.

Figure 13:
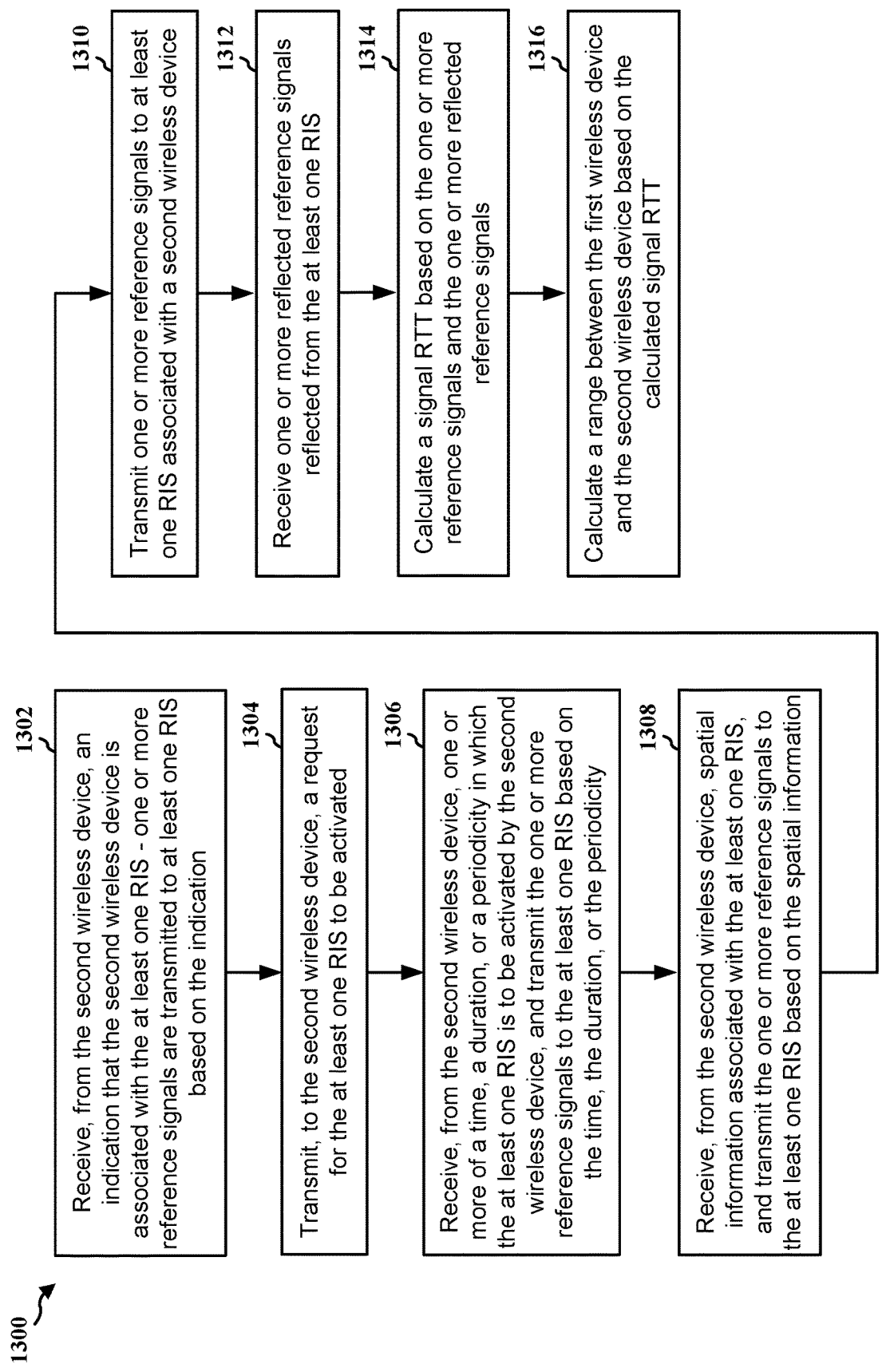
FIG. 13 is a flowchart of a method of wireless communication in accordance with aspects presented herein.

FIG. 13 is a flowchart 1300 of a method of wireless communication. The method may be performed by a wireless device or a component of a wireless device (e.g., the UE 104; the device 350; the first wireless device 602; the first UE 802; the apparatus 1502; a processing system, which may include the memory 360 and which may be the entire device 350 or a component of the device 350, such as the TX processor 368, the RX processor 356, and/or the controller/ processor 359). The method may enable the wireless device to perform an SL ranging based on a single-sided PRS transmission.

At 1302, a first wireless device may receive, from the second wireless device, an indication that the second wireless device is associated with the at least one RIS, and where the one or more reference signals may be transmitted to the at least one RIS based on the indication, such as described in connection with FIG. 8. For example, at 816, the first UE 802 may receive an RIS capable indication 818 from the second UE 804, where the RIS capable indication 818 may indicate that the second UE 804 is associated with at last one RIS. The reception of the indication that the second wireless device is associated with the at least one RIS may be performed by, e.g., the RIS detection component 1540 and/or the reception component 1530 of the apparatus 1502 in FIG. 15. In one example, the first wireless device may be a full duplex UE.

At 1304, the first wireless device may transmit, to the second wireless device, a request for the at least one RIS to be activated, such as described in connection with FIG. 8. For example, at 838, the first UE 802 may transmit an RIS activation request 840 to the second UE 804. The transmission of the request may be performed by, e.g., the RIS request component 1542 and/or the transmission component 1534 of the apparatus 1502 in FIG. 15.

In one example, the first wireless device may receive, from the second wireless device, an indication of resources for transmitting the one or more reference signals, where the first wireless device may transmit the one or more reference signal based on the received indication of resources.

At 1306, the first wireless device may receive, from the second wireless device, one or more of a time, a duration, or a periodicity in which the at least one RIS is to be activated by the second wireless device, and the first wireless device may transmit the one or more reference signals to the at least one RIS based on the time, the duration, or the periodicity, such as described in connection with FIG. 8. For example, at 820, the first UE 802 may receive the RIS resource indication 822 from the second UE 804, where the RIS resource indication 822 may indicate at least one of a time, a duration, or a periodicity in which the RIS 806 is to be activated. The reception of the time, the duration, or the periodicity in which the at least one RIS is to be activated may be performed by, e.g., the RIS activate time process component 1544 and/or the reception component 1530 of the apparatus 1502 in FIG. 15.

At 1308, the first wireless device may receive, from the second wireless device, spatial information associated with the at least one RIS, and the first wireless device may transmit the one or more reference signals to the at least one RIS based on the spatial information, such as described in connection with FIG. 8. For example, at 834, the first UE 802 may receive an RIS spatial information 836 from the second UE 804. The reception of the spatial information associated with the at least one RIS may be performed by, e.g., the RIS spatial information process component 1546 and/or the reception component 1530 of the apparatus 1502 in FIG. 15.

In one example, the spatial information may include at least one of a precoding weight for an incident signal, a beam direction for an incident signal, a precoding weight for a reflected signal, or a beam direction for a reflected signal. In another example, the first wireless device may receive the spatial information via a sidelink broadcast message.

At 1310, the first wireless device may transmit one or more reference signals to at least one RIS associated with a second wireless device, such as described in connection with FIG. 8. For example, at 824, the first UE 802 may transmit PRS 810 to the RIS 806. The transmission of the one or more reference signals may be performed by, e.g., the PRS configuration component 1548 and/or the transmission component 1534 of the apparatus 1502 in FIG. 15. In one example, the one or more reference signals may be SL PRSs.

In another example, the first wireless device may transmit the one or more reference signals in a range of beam directions during a time in which the at least one RIS is activated, such as described in connection with FIGS. 11 and 12.

In another example, the first wireless device may indicate, to the second wireless device, a time in which the one or more reference signals are to be transmitted by the first wireless device, and the first wireless device may transmit the one or more reference signal to the at least one RIS based on the time indicated.

In another example, the first wireless device may transmit the one or more reference signals to the at least one RIS based on the first wireless device and the at least one RIS being LOS.

At 1312, the first wireless device may receive one or more reflected reference signals reflected from the at least one RIS, such as described in connection with FIG. 8. For example, at 826, the first UE 802 may receive reflected PRS 812 from the RIS 806. The reception of the one or more reflected reference signals may be performed by, e.g., the reflected PRS process component 1550 and/or the reception component 1530 of the apparatus 1502 in FIG. 15.

In one example, the first wireless device may receive the one or more reflected reference signals via a first reflected path, a strongest reflected path, or a path with a CIR exceeding a threshold from the at least one RIS.

In another example, the first wireless device may measure clutter echo associated with the one or more reference signals if the one or more reference signals are transmitted to the at least one RIS in a duration in which the at least one RIS is not activated, and the first wireless device may receive the one or more reflected reference signals with the measured clutter echo taken into consideration.

At 1314, the first wireless device may calculate a signal RTT based on the one or more reference signals and the one or more reflected reference signals, such as described in connection with FIG. 8. For example, at 828, the first UE 802 may calculate a signal RTT 830 based on the transmitted PRS 810 and the reflected PRS 812. The calculation of the signal RTT may be performed by, e.g., the RTT calculation component 1552 of the apparatus 1502 in FIG. 15.

In one example, the first wireless device may calculate the signal RTT based on a time the first wireless device transmits the one or more reference signal and a time the first wireless device receives the one or more reflected reference signals.

At 1316, the first wireless device may calculate a range between the first wireless device and the second wireless device based on the calculated signal RTT, such as described in connection with FIG. 8. For example, at 832, the first UE 802 may calculate a range between the first UE 802 and second UE 804 based on the RTT 830. The calculation of the range may be performed by, e.g., the range calculation component 1554 of the apparatus 1502 in FIG. 15.

Figure 14:
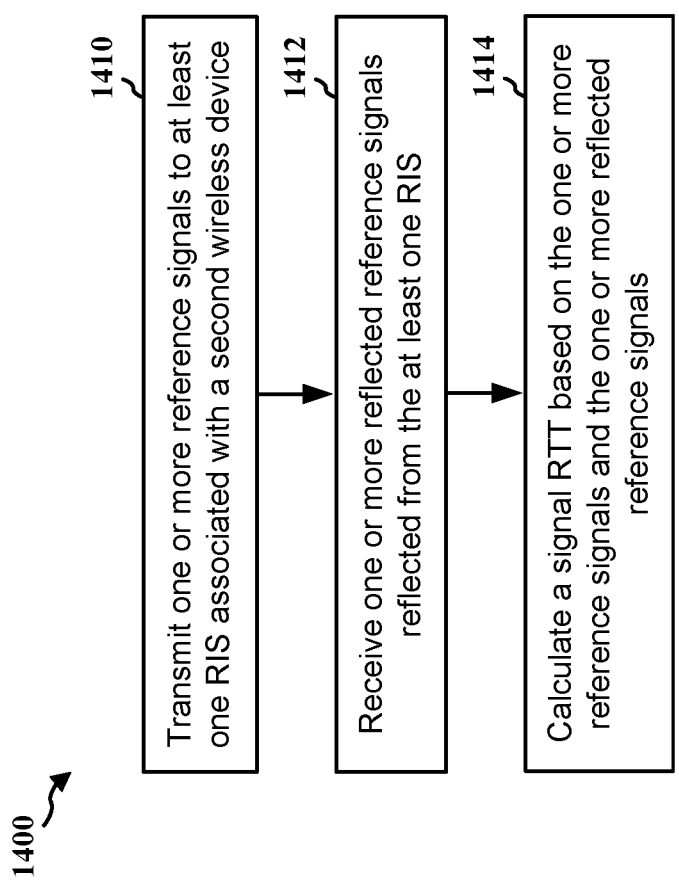
FIG. 14 is a flowchart of a method of wireless communication in accordance with aspects presented herein.

FIG. 14 is a flowchart 1400 of a method of wireless communication. The method may be performed by a wireless device or a component of a wireless device (e.g., the UE 104; the first wireless device 602, 350; the first UE 802; the apparatus 1502; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the wireless device to perform an SL ranging based on a single-sided PRS transmission.

At 1410, a first wireless device may transmit one or more reference signals to at least one RIS associated with a second wireless device, such as described in connection with FIG. 8. For example, at 824, the first UE 802 may transmit PRS 810 to the RIS 806. The transmission of the one or more reference signals may be performed by, e.g., the PRS configuration component 1548 and/or the transmission component 1534 of the apparatus 1502 in FIG. 15. In one example, the one or more reference signals may be SL PRSs.

In another example, the first wireless device may transmit the one or more reference signals in a range of beam directions during a time in which the at least one RIS is activated, such as described in connection with FIGS. 11 and 12.

In another example, the first wireless device may indicate, to the second wireless device, a time in which the one or more reference signals are to be transmitted by the first wireless device, and the first wireless device may transmit the one or more reference signal to the at least one RIS based on the time indicated.

In another example, the first wireless device may transmit the one or more reference signals to the at least one RIS based on the first wireless device and the at least one RIS being LOS.

At 1412, the first wireless device may receive one or more reflected reference signals reflected from the at least one RIS, such as described in connection with FIG. 8. For example, at 826, the first UE 802 may receive reflected PRS 812 from the RIS 806. The reception of the one or more reflected reference signals may be performed by, e.g., the reflected PRS process component 1550 and/or the reception component 1530 of the apparatus 1502 in FIG. 15.

In one example, the first wireless device may receive the one or more reflected reference signals via a first reflected path, a strongest reflected path, or a path with a CIR exceeding a threshold from the at least one RIS.

In another example, the first wireless device may measure clutter echo associated with the one or more reference signals if the one or more reference signals are transmitted to the at least one RIS in a duration in which the at least one RIS is not activated, and the first wireless device may receive the one or more reflected reference signals with the measured clutter echo taken into consideration.

At 1414, the first wireless device may calculate a signal RTT based on the one or more reference signals and the one or more reflected reference signals, such as described in connection with FIG. 8. For example, at 828, the first UE 802 may calculate a signal RTT 830 based on the transmitted PRS 810 and the reflected PRS 812. The calculation of the signal RTT may be performed by, e.g., the RTT calculation component 1552 of the apparatus 1502 in FIG. 15.

In one example, the first wireless device may calculate the signal RTT based on a time the first wireless device transmits the one or more reference signal and a time the first wireless device receives the one or more reflected reference signals.

In another example, the first wireless device may calculate a range between the first wireless device and the second wireless device based on the calculated signal RTT, such as described in connection with FIG. 8. For example, at 832, the first UE 802 may calculate a range between the first UE 802 and second UE 804 based on the RTT 830. The calculation of the range may be performed by, e.g., the range calculation component 1554 of the apparatus 1502 in FIG. 15.

In another example, the first wireless device may receive, from the second wireless device, an indication that the second wireless device is associated with the at least one RIS, and where the one or more reference signals may be transmitted to the at least one RIS based on the indication, such as described in connection with FIG. 8. For example, at 816, the first UE 802 may receive an RIS capable indication 818 from the second UE 804, where the RIS capable indication 818 may indicate that the second UE 804 is associated with at last one RIS. The reception of the indication that the second wireless device is associated with the at least one RIS may be performed by, e.g., the RIS detection component 1540 and/or the reception component 1530 of the apparatus 1502 in FIG. 15. In another example, the first wireless device may be a full duplex UE.

In another example, the first wireless device may transmit, to the second wireless device, a request for the at least one RIS to be activated, such as described in connection with FIG. 8. For example, at 838, the first UE 802 may transmit an RIS activation request 840 to the second UE 804. The transmission of the request may be performed by, e.g., the RIS request component 1542 and/or the transmission component 1534 of the apparatus 1502 in FIG. 15.

In another example, the first wireless device may receive, from the second wireless device, an indication of resources for transmitting the one or more reference signals, where the first wireless device may transmit the one or more reference signal based on the received indication of resources.

In another example, the first wireless device may receive, from the second wireless device, one or more of a time, a duration, or a periodicity in which the at least one RIS is to be activated by the second wireless device, and the first wireless device may transmit the one or more reference signals to the at least one RIS based on the time, the duration, or the periodicity, such as described in connection with FIG. 8. For example, at 820, the first UE 802 may receive the RIS resource indication 822 from the second UE 804, where the RIS resource indication 822 may indicate at least one of a time, a duration, or a periodicity in which the RIS 806 is to be activated. The reception of the time, the duration, or the periodicity in which the at least one RIS is to be activated may be performed by, e.g., the RIS activate time process component 1544 and/or the reception component 1530 of the apparatus 1502 in FIG. 15.

In another example, the first wireless device may receive, from the second wireless device, spatial information associated with the at least one RIS, and the first wireless device may transmit the one or more reference signals to the at least one RIS based on the spatial information, such as described in connection with FIG. 8. For example, at 834, the first UE 802 may receive an RIS spatial information 836 from the second UE 804. The reception of the spatial information associated with the at least one RIS may be performed by, e.g., the RIS spatial information process component 1546 and/or the reception component 1530 of the apparatus 1502 in FIG. 15.

In another example, the spatial information may include at least one of a precoding weight for an incident signal, a beam direction for an incident signal, a precoding weight for a reflected signal, or a beam direction for a reflected signal. In another example, the first wireless device may receive the spatial information via a sidelink broadcast message.

Figure 15:
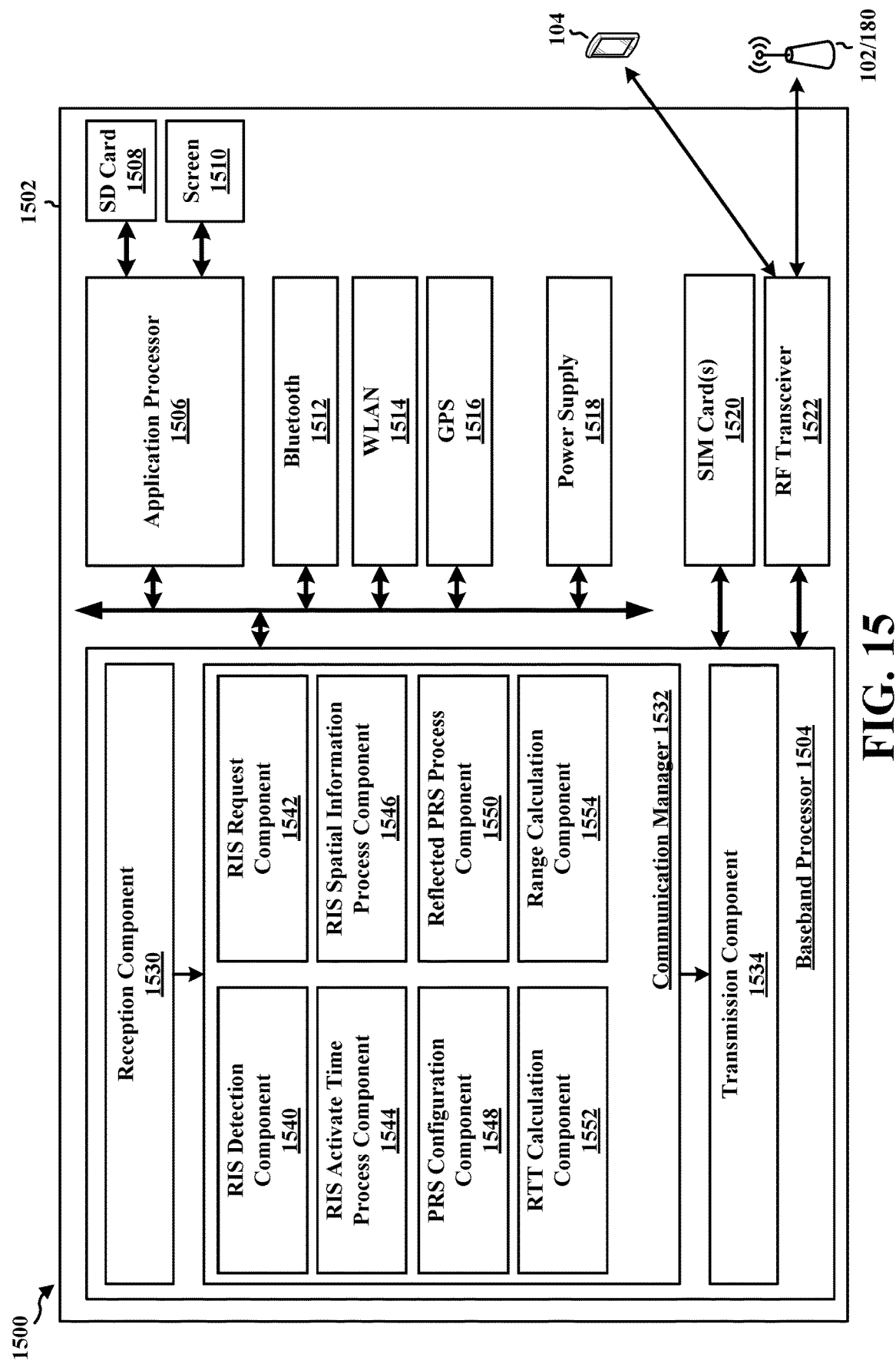
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a baseband processor 1504 (also referred to as a modem) coupled to a RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described supra. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the UE (e.g., of the device 350) and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an RIS detection component 1540 that is configured to receive, from the second wireless device, an indication that the second wireless device is associated with the at least one RIS, and where the one or more reference signals are transmitted to the at least one RIS based on the indication, e.g., as described in connection with 1302 of FIG. 13. The communication manager 1532 further includes an RIS request component 1542 that is configured to transmit, to the second wireless device, a request for the at least one RIS to be activated, e.g., as described in connection with 1304 of FIG. 13. The communication manager 1532 further includes an RIS activate time process component 1544 that is configured to receive, from the second wireless device, one or more of a time, a duration, or a periodicity in which the at least one RIS is to be activated by the second wireless device, and transmit the one or more reference signals to the at least one RIS based on the time, the duration, or the periodicity, e.g., as described in connection with 1306 of FIG. 13. The communication manager 1532 further includes an RIS spatial information process component 1546 that is configured to receive, from the second wireless device, spatial information associated with the at least one RIS, and transmit the one or more reference signals to the at least one RIS based on the spatial information, e.g., as described in connection with 1308 of FIG. 13. The communication manager 1532 further includes a PRS configuration component 1548 that is configured to transmit one or more reference signals to at least one RIS associated with a second wireless device, e.g., as described in connection with 1310 of FIG. 13 and/or 1410 of FIG. 14. The communication manager 1532 further includes a reflected PRS process component 1550 that is configured to receive one or more reflected reference signals reflected from the at least one RIS, e.g., as described in connection with 1312 of FIG. 13 and/or 1412 of FIG. 14. The communication manager 1532 further includes an RTT calculation component 1552 that is configured to calculate a signal RTT based on the one or more reference signals and the one or more reflected reference signals, e.g., as described in connection with 1314 of FIG. 13 and/or 1414 of FIG. 14. The communication manager 1532 further includes a range calculation component 1554 that is configured to calculate a range between the first wireless device and the second wireless device based on the calculated signal RTT, e.g., as described in connection with 1316 of FIG. 13.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband processor 1504, includes means for receiving, from the second wireless device, an indication that the second wireless device is associated with the at least one RIS, and where the one or more reference signals are transmitted to the at least one RIS based on the indication (e.g., the RIS detection component 1540 and/or the reception component 1530). The apparatus 1502 includes means for transmitting, to the second wireless device, a request for the at least one RIS to be activated (e.g., the RIS request component 1542 and/or the transmission component 1534). The apparatus 1502 includes means for receiving, from the second wireless device, one or more of a time, a duration, or a periodicity in which the at least one RIS is to be activated by the second wireless device, and means for transmitting the one or more reference signals to the at least one RIS based on the time, the duration, or the periodicity (e.g., the RIS activate time process component 1544 and/or the reception component 1530). The apparatus 1502 includes means for receiving, from the second wireless device, spatial information associated with the at least one RIS, and means for transmitting the one or more reference signals to the at least one RIS based on the spatial information (e.g., the RIS spatial information process component 1546 and/or the reception component 1530). The apparatus 1502 includes means for transmitting one or more reference signals to at least one RIS associated with a second wireless device (e.g., the PRS configuration component 1548 and/or the transmission component 1534). The apparatus 1502 includes means for receiving one or more reflected reference signals reflected from the at least one RIS (e.g., the reflected PRS process component 1550 and/or the reception component 1530). The apparatus 1502 includes means for calculating a signal RTT based on the one or more reference signals and the one or more reflected reference signals (e.g., the RTT calculation component 1552). The apparatus 1502 includes means for calculating a range between the first wireless device and the second wireless device based on the calculated signal RTT (e.g., the range calculation component 1554).

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 16:
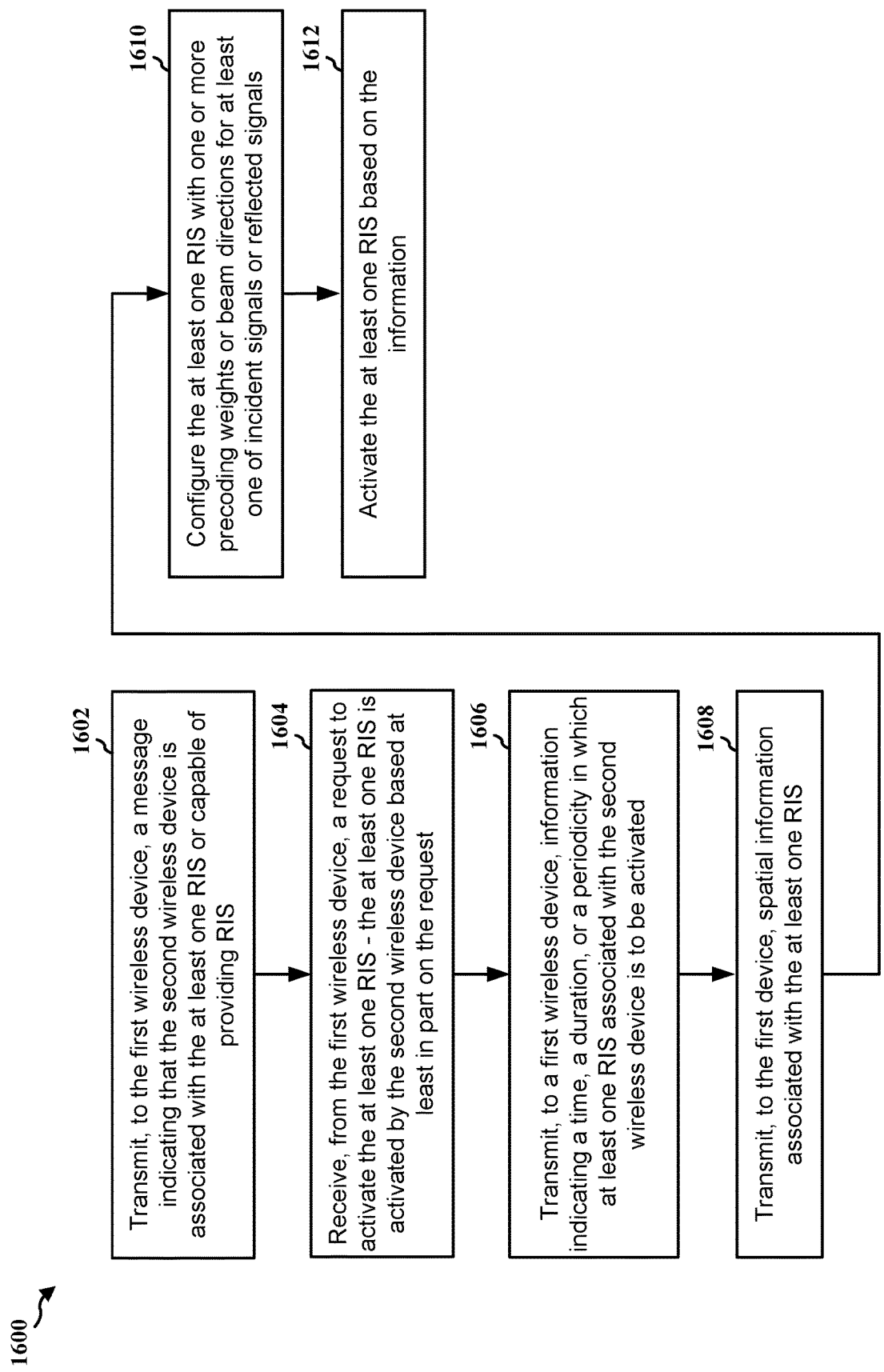
FIG. 16 is a flowchart of a method of wireless communication in accordance with aspects presented herein.

FIG. 16 is a flowchart 1600 of a method of wireless communication. The method may be performed by a wireless device or a component of a wireless device (e.g., the UE 104; the second wireless device 604; the device 350; the second UE 804; the apparatus 1802; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the wireless device to control at least one RIS that is associated or co-located with the wireless device.

At 1602, a second wireless device may transmit, to a first wireless device, a message indicating that the second wireless device is associated with the at least one RIS or capable of providing RIS, such as described in connection with FIG. 8. For example, at 816, the second UE 804 may transmit an RIS capable indication 818 to the first UE 802, where the RIS capable indication 818 may indicate that the second UE 804 is associated with at last one RIS. The transmission of the indication that the second wireless device is associated with the at least one RIS may be performed by, e.g., the RIS capable indication component 1840 and/or the transmission component 1834 of the apparatus 1802 in FIG. 18.

At 1604, the second wireless device may receive, from the first wireless device, a request to activate the at least one RIS, and wherein the at least one RIS is activated by the second wireless device based at least in part on the request, such as described in connection with FIG. 8. For example, at 838, the second UE 804 may receive an RIS activation request 840 from the first UE 802. The reception of the request may be performed by, e.g., the RIS request process component 1842 and/or the reception component 1830 of the apparatus 1802 in FIG. 18.

In one example, the second wireless device may receive, from the first wireless device, an indication indicating a time in which one or more reference signals are to be transmitted by the first wireless device, and the second wireless device may activate the at least one RIS based at least in part on the indication.

At 1606, the second wireless device may transmit, to a first wireless device, information indicating a time, a duration, or a periodicity in which at least one RIS associated with the second wireless device is to be activated, such as described in connection with FIG. 8. For example, at 820, the second UE 804 may transmit an RIS resource indication 822 to the first UE 802, where the RIS resource indication 822 may indicate at least one of a time, a duration, or a periodicity in which the RIS 806 is to be activated. The transmission of the information may be performed by, e.g., the RIS activate time indication component 1844 and/or the transmission component 1834 of the apparatus 1802 in FIG. 18. The second wireless device may transmit the information via a sidelink broadcast message.

At 1608, the second wireless device may transmit, to the first device, spatial information associated with the at least one RIS, such as described in connection with FIG. 8. For example, at 834, the second UE 804 may transmit an RIS spatial information 836 to the first UE 802. The transmission of the spatial information associated with the at least one RIS may be performed by, e.g., the RIS spatial information indication component 1846 and/or the transmission component 1834 of the apparatus 1802 in FIG. 18. The second wireless device may transmit the spatial information via a sidelink broadcast message.

In one example, the spatial information may include at least one of a precoding weight for an incident signal, a beam direction for an incident signal, a precoding weight for a reflected signal, or a beam direction for a reflected signal.

Figure 10:
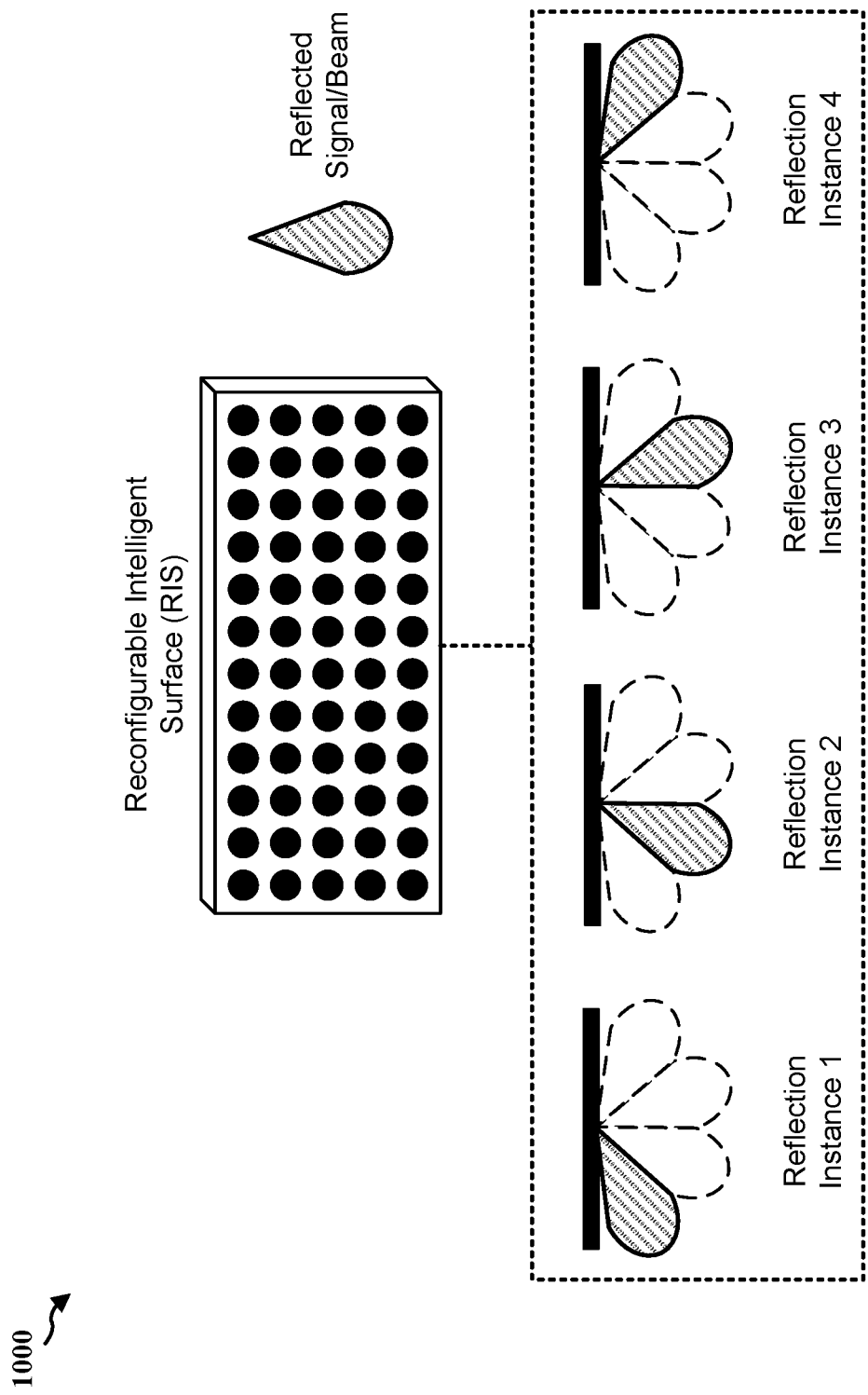
FIG. 10 is a diagram illustrating an example of an RIS configured to reflect signals dynamically in accordance with various aspects of the present disclosure.

At 1610, the second wireless device may configure the at least one RIS with one or more precoding weights or beam directions for at least one of incident signals or reflected signals, such as described in connection with FIGS. 9 and 10. The configuration of the at least one RIS may be performed by, e.g., the RIS configuration component 1848 of the apparatus 1802 in FIG. 18.

In one example, the second wireless device may configure a same precoding weight or a same beam direction for the at least one of incident signals or reflected signals across multiple time slots. In another example, the second wireless device may configure different precoding weights or beam directions for the at least one of incident signals or reflected signals across different time slots.

At 1612, the second wireless device may activate the at least one RIS based on the information, such as described in connection with FIG. 8. For example, at 842, the second UE 804 may activate the RIS 806 based on the RIS activation request 840, the RIS resource indication 822, and/or a time indicated by the first UE 802. The activation of the at least one RIS may be performed by, e.g., the RIS activation component 1850 of the apparatus 1802 in FIG. 18.

Figure 17:
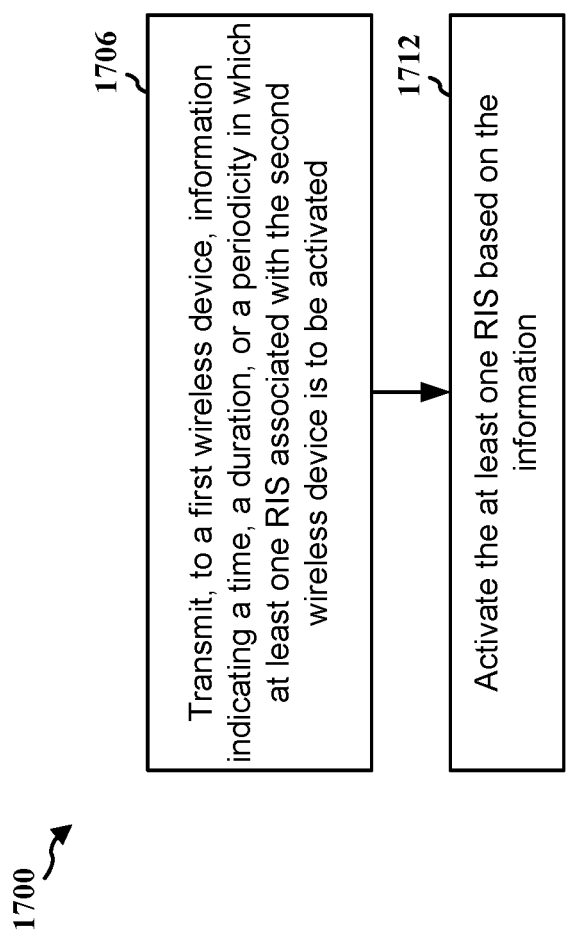
FIG. 17 is a flowchart of a method of wireless communication in accordance with aspects presented herein.

FIG. 17 is a flowchart 1700 of a method of wireless communication. The method may be performed by a wireless device or a component of a wireless device (e.g., the UE 104; the device 350; the second wireless device 604; the second UE 804; the apparatus 1802; a processing system, which may include the memory 360 and which may be the entire UE (e.g., the device 350) or a component of the UE (e.g., a component of the device 350), such as the TX processor 368, the RX processor 356, and/or the controller/processor 359). The method may enable the wireless device to control at least one RIS that is associated or co-located with the wireless device.

At 1706, a second wireless device may transmit, to a first wireless device, information indicating a time, a duration, or a periodicity in which at least one RIS associated with the second wireless device is to be activated, such as described in connection with FIG. 8. For example, at 820, the second UE 804 may transmit an RIS resource indication 822 to the first UE 802, where the RIS resource indication 822 may indicate at least one of a time, a duration, or a periodicity in which the RIS 806 is to be activated. The transmission of the information may be performed by, e.g., the RIS activate time indication component 1844 and/or the transmission component 1834 of the apparatus 1802 in FIG. 18. The second wireless device may transmit the information via a sidelink broadcast message.

At 1712, the second wireless device may activate the at least one RIS based on the information, such as described in connection with FIG. 8. For example, at 842, the second UE 804 may activate the RIS 806 based on the RIS activation request 840, the RIS resource indication 822, and/or a time indicated by the first UE 802. The activation of the at least one RIS may be performed by, e.g., the RIS activation component 1850 of the apparatus 1802 in FIG. 18.

In one example, the second wireless device may transmit, to the first wireless device, a message indicating that the second wireless device is associated with the at least one RIS or capable of providing RIS, such as described in connection with FIG. 8. For example, at 816, the second UE 804 may transmit an RIS capable indication 818 to the first UE 802, where the RIS capable indication 818 may indicate that the second UE 804 is associated with at last one RIS. The transmission of the indication that the second wireless device is associated with the at least one RIS may be performed by, e.g., the RIS capable indication component 1840 and/or the transmission component 1834 of the apparatus 1802 in FIG. 18.

In another example, the second wireless device may receive, from the first wireless device, a request to activate the at least one RIS, and wherein the at least one RIS is activated by the second wireless device based at least in part on the request, such as described in connection with FIG. 8. For example, at 838, the second UE 804 may receive an RIS activation request 840 from the first UE 802. The reception of the request may be performed by, e.g., the RIS request process component 1842 and/or the reception component 1830 of the apparatus 1802 in FIG. 18.

In another example, the second wireless device may receive, from the first wireless device, an indication indicating a time in which one or more reference signals are to be transmitted by the first wireless device, and the second wireless device may activate the at least one RIS based at least in part on the indication.

In another example, the second wireless device may transmit, to the first device, spatial information associated with the at least one RIS, such as described in connection with FIG. 8. For example, at 834, the second UE 804 may transmit an RIS spatial information 836 to the first UE 802. The transmission of the spatial information associated with the at least one RIS may be performed by, e.g., the RIS spatial information indication component 1846 and/or the transmission component 1834 of the apparatus 1802 in FIG. 18. The second wireless device may transmit the spatial information via a sidelink broadcast message.

In another example, the spatial information may include at least one of a precoding weight for an incident signal, a beam direction for an incident signal, a precoding weight for a reflected signal, or a beam direction for a reflected signal.

In another example, the second wireless device may configure the at least one RIS with one or more precoding weights or beam directions for at least one of incident signals or reflected signals, such as described in connection with FIGS. 9 and 10. The configuration of the at least one RIS may be performed by, e.g., the RIS configuration component 1848 of the apparatus 1802 in FIG. 18.

In another example, the second wireless device may configure a same precoding weight or a same beam direction for the at least one of incident signals or reflected signals across multiple time slots. In another example, the second wireless device may configure different precoding weights or beam directions for the at least one of incident signals or reflected signals across different time slots.

Figure 18:
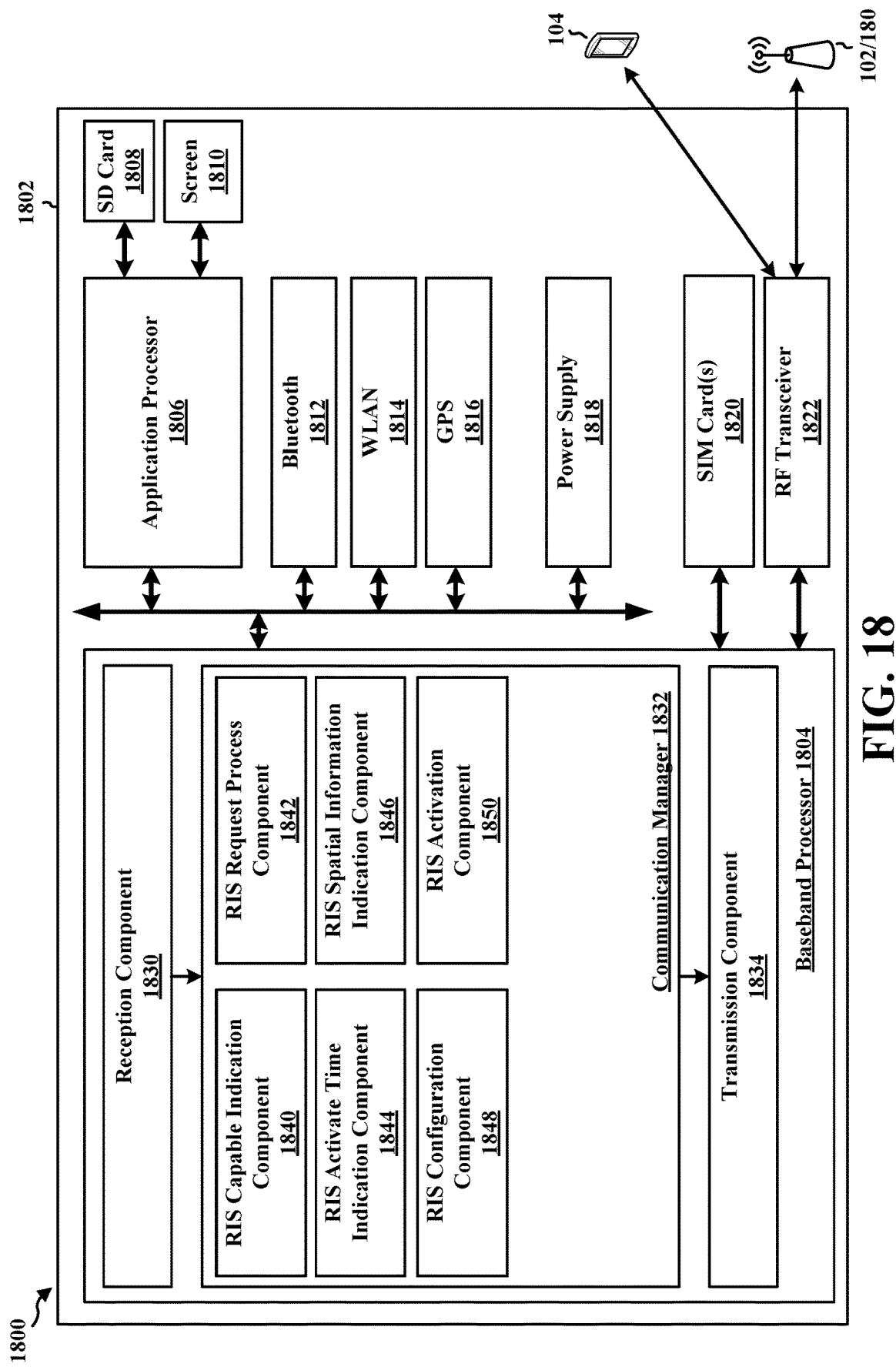
FIG. 18 is a diagram illustrating an example of a hardware implementation for an example apparatus in accordance with aspects presented herein.

FIG. 18 is a diagram 1800 illustrating an example of a hardware implementation for an apparatus 1802. The apparatus 1802 may be a UE, a component of a UE, or may implement UE functionality. In some aspects, the apparatus 1802 may include a baseband processor 1804 (also referred to as a modem) coupled to a RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The baseband processor 1804 communicates through the RF transceiver 1822 with the UE 104 and/or BS 102/180. The baseband processor 1804 may include a computer-readable medium/memory. The computer-readable medium/memory may be non-transitory. The baseband processor 1804 is responsible for general processing, including the execution of software stored on the computer-readable medium/memory. The software, when executed by the baseband processor 1804, causes the baseband processor 1804 to perform the various functions described supra. The computer-readable medium/memory may also be used for storing data that is manipulated by the baseband processor 1804 when executing software. The baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband processor 1804. The baseband processor 1804 may be a component of the UE (e.g., a component of the device 350) and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes an RIS capable indication component 1840 that is configured to transmit, to the first wireless device, a message indicating that the second wireless device is associated with the at least one RIS or capable of providing RIS, e.g., as described in connection with 1602 of FIG. 16. The communication manager 1832 further includes an RIS request process component 1842 that is configured to receive, from the first wireless device, a request to activate the at least one RIS, and wherein the at least one RIS is activated by the second wireless device based at least in part on the request, e.g., as described in connection with 1604 of FIG. 16. The communication manager 1832 further includes an RIS activate time indication component 1844 that is configured to transmit, to a first wireless device, information indicating a time, a duration, or a periodicity in which at least one RIS associated with the second wireless device is to be activated, e.g., as described in connection with 1606 of FIG. 16 and/or 1706 of FIG. 17. The communication manager 1832 further includes an RIS spatial information indication component 1846 that is configured to transmit, to the first device, spatial information associated with the at least one RIS, e.g., as described in connection with 1608 of FIG. 16. The communication manager 1832 further includes an RIS configuration component 1848 that is configured to configure the at least one RIS with one or more precoding weights or beam directions for at least one of incident signals or reflected signals, e.g., as described in connection with 1610 of FIG. 16. The communication manager 1832 further includes an RIS activation component 1850 that is configured to activate the at least one RIS based on the information, e.g., as described in connection with 1612 of FIG. 16 and/or 1712 of FIG. 17.

The apparatus may include additional components that perform each of the blocks of the algorithm in the flowcharts of FIGS. 16 and 17. As such, each block in the flowcharts of FIGS. 16 and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the baseband processor 1804, includes means for transmitting, to the first wireless device, a message indicating that the second wireless device is associated with the at least one RIS or capable of providing RIS (e.g., the RIS capable indication component 1840 and/or the transmission component 1834).

The apparatus 1802 includes means for receiving, from the first wireless device, a request to activate the at least one RIS, and where the at least one RIS is activated by the second wireless device based at least in part on the request (e.g., the RIS request process component 1842 and/or the reception component 1830). The apparatus 1802 includes means for transmitting, to a first wireless device, information indicating a time, a duration, or a periodicity in which at least one RIS associated with the second wireless device is to be activated (e.g., the RIS activate time indication component 1844 and/or the transmission component 1834). The apparatus 1802 includes means for transmit, to the first device, spatial information associated with the at least one RIS (e.g., the RIS spatial information indication component 1846 and/or the transmission component 1834). The apparatus 1802 includes means for configuring the at least one RIS with one or more precoding weights or beam directions for at least one of incident signals or reflected signals (e.g., the RIS configuration component 1848). The apparatus 1802 includes means for activating the at least one RIS based on the information (e.g., the RIS activation component 1850).

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first wireless device comprising: transmitting one or more reference signals to at least one RIS associated with a second wireless device; receiving one or more reflected reference signals reflected from the at least one RIS; and calculating a signal RTT based on the one or more reference signals and the one or more reflected reference signals.

In aspect 2, the method of aspect 1 further includes that the one or more reference signals are SL PRSs.

In aspect 3, the method of any of aspects 1 and 2 further includes that the first wireless device is a full duplex UE.

In aspect 4, the method of any of aspects 1 to 3 further comprises: calculating the signal RTT based on a time the first wireless device transmits the one or more reference signal and a time the first wireless device receives the one or more reflected reference signals.

In aspect 5, the method of any of aspects 1 to 4 further comprises: calculating a range between the first wireless device and the second wireless device based on the calculated signal RTT.

In aspect 6, the method of any of aspects 1 to 5 further comprises: receiving, from the second wireless device, an indication that the second wireless device is associated with the at least one RIS, and wherein the one or more reference signals are transmitted to the at least one RIS based on the indication.

In aspect 7, the method of any of aspects 1 to 6 further comprises: receiving, from the second wireless device, one or more of a time, a duration, or a periodicity in which the at least one RIS is to be activated by the second wireless device, and wherein the first wireless device transmits the one or more reference signals to the at least one RIS based on the time, the duration, or the periodicity.

In aspect 8, the method of any of aspects 1 to 7 further comprises: receiving, from the second wireless device, spatial information associated with the at least one RIS, and wherein the first wireless device transmits the one or more reference signals to the at least one RIS based on the spatial information.

In aspect 9, the method of any of aspects 1 to 8 further includes that the spatial information includes at least one of a precoding weight for an incident signal, a beam direction for an incident signal, a precoding weight for a reflected signal, or a beam direction for a reflected signal.

In aspect 10, the method of any of aspects 1 to 9 further comprises: receiving the spatial information via a sidelink broadcast message.

In aspect 11, the method of any of aspects 1 to 10 further comprises: transmitting the one or more reference signals in a range of beam directions during a time in which the at least one RIS is activated.

In aspect 12, the method of any of aspects 1 to 11 further comprises: transmitting, to the second wireless device, a request for the at least one RIS to be activated.

In aspect 13, the method of any of aspects 1 to 12 further comprises: receiving, from the second wireless device, an indication of resources for transmitting the one or more reference signals, where the first wireless device transmits the one or more reference signal based on the received indication of resources.

In aspect 14, the method of any of aspects 1 to 13 further comprises: indicating, to the second wireless device, a time in which the one or more reference signals are to be transmitted by the first wireless device, and transmitting the one or more reference signal to the at least one RIS based on the time indicated.

In aspect 15, the method of any of aspects 1 to 14 further comprises: transmitting the one or more reference signals to the at least one RIS based on the first wireless device and the at least one RIS being LOS.

In aspect 16, the method of any of aspects 1 to 15 further comprises: receiving the one or more reflected reference signals via a first reflected path, a strongest reflected path, or a path with a CIR exceeding a threshold from the at least one RIS.

In aspect 17, the method of any of aspects 1 to 16 further comprises: measuring clutter echo associated with the one or more reference signals if the one or more reference signals are transmitted to the at least one RIS in a duration in which the at least one RIS is not activated, and wherein the one or more reflected reference signals are received with the measured clutter echo taken into consideration.

Aspect 18 is an apparatus for wireless communication including at least one processor coupled to a memory and configured to implement any of aspects 1 to 17.

Aspect 19 is an apparatus as in aspect 18, further including a transceiver coupled to the at least one processor.

Aspect 20 is an apparatus for wireless communication including means for implementing any of aspects 1 to 17.

Aspect 21 is a computer-readable medium storing computer executable code, where the code when executed by a processor causes the processor to implement any of aspects 1 to 17.

Aspect 22 is a method of wireless communication at a second wireless device, comprising: transmitting, to a first wireless device, information indicating a time, a duration, or a periodicity in which at least one RIS associated with the second wireless device is to be activated; and activating the at least one RIS based on the information.

In aspect 23, the method of aspect 22 further comprises: transmitting the information via a sidelink broadcast message.

In aspect 24, the method of any of aspects 22 and 23 further comprises: transmitting, to the first wireless device, a message indicating that the second wireless device is associated with the at least one RIS or capable of providing RIS.

In aspect 25, the method of any of aspects 22 to 24 further comprises: configuring the at least one RIS with one or more precoding weights or beam directions for at least one of incident signals or reflected signals.

In aspect 26, the method of any of aspects 22 to 25 further comprises: configuring a same precoding weight or a same beam direction for the at least one of incident signals or reflected signals across multiple time slots.

In aspect 27, the method of any of aspects 22 to 25 further comprises: configuring different precoding weights or beam directions for the at least one of incident signals or reflected signals across different time slots.

In aspect 28, the method of any of aspects 22 to 27 further comprises: transmitting, to the first device, spatial information associated with the at least one RIS.

In aspect 29, the method of any of aspects 22 to 28 further includes that the spatial information includes at least one of a precoding weight for an incident signal, a beam direction for an incident signal, a precoding weight for a reflected signal, or a beam direction for a reflected signal.

In aspect 30, the method of any of aspects 22 to 29 further comprises: transmitting the spatial information via a sidelink broadcast message.

In aspect 31, the method of any of aspects 22 to 30 further comprises: receiving, from the first wireless device, a request to activate the at least one RIS, and wherein the at least one RIS is activated by the second wireless device based at least in part on the request.

In aspect 32, the method of any of aspects 22 to 31 further comprises: receiving, from the first wireless device, an indication indicating a time in which one or more reference signals are to be transmitted by the first wireless device, and wherein the at least one RIS is activated by the second wireless device based at least in part on the indication.

Aspect 33 is an apparatus for wireless communication including at least one processor coupled to a memory and configured to implement any of aspects 22 to 32.

Aspect 34 is an apparatus as in aspect 33, further including a transceiver coupled to the at least one processor.

Aspect 35 is an apparatus for wireless communication including means for implementing any of aspects 22 to 32.

Aspect 36 is a computer-readable medium storing computer executable code, where the code when executed by a processor causes the processor to implement any of aspects 22 to 32.

What is claimed is:

1. An apparatus for wireless communication at a first user equipment (UE), comprising:
   a memory; and
   at least one processor coupled to the memory and configured to:
      receive, from a second UE, an indication that the second UE is associated with at least one reconfigurable intelligent surface (RIS);
      transmit one or more sidelink reference signals to the at least one RIS associated with the second UE based on the indication;
      receive one or more reflected reference signals reflected from the at least one RIS; and
      calculate a signal round-trip time (RTT) based on the one or more sidelink reference signals and the one or more reflected reference signals.

2. The apparatus of claim 1, wherein the one or more sidelink reference signals are sidelink (SL) positioning reference signals (PRSs).

3. The apparatus of claim 1, wherein the first UE is a full duplex user equipment (UE).

4. The apparatus of claim 1, wherein the memory and the at least one processor are configured to calculate the signal RTT based on a first time the first UE transmits the one or more sidelink reference signals and a second time the first UE receives the one or more reflected reference signals.

5. The apparatus of claim 1, wherein the memory and the at least one processor are further configured to:
calculate a range between the first UE and the second UE based on the calculated signal RTT.

6. The apparatus of claim 1, wherein the first UE is located on a first vehicle and the second UE is located on a second vehicle, wherein the memory and the at least one processor are further configured to:
calculate a range between the first vehicle and the second vehicle based on the calculated signal RTT.

7. The apparatus of claim 1, wherein the memory and the at least one processor are further configured to:
receive, from the second UE, one or more of a time, a duration, or a periodicity in which the at least one RIS is to be activated by the second UE, and wherein the memory and the at least one processor are configured to transmit the one or more sidelink reference signals to the at least one RIS based on the time, the duration, or the periodicity.

8. The apparatus of claim 1, wherein the memory and the at least one processor are further configured to:
receive, from the second UE, spatial information associated with the at least one RIS, and wherein the memory and the at least one processor are configured to transmit the one or more sidelink reference signals to the at least one RIS based on the spatial information.

9. The apparatus of claim 8, wherein the spatial information includes at least one of a first precoding weight for an incident signal, a first beam direction for the incident signal, a second precoding weight for a reflected signal, or a second beam direction for the reflected signal.

10. The apparatus of claim 8, wherein the memory and the at least one processor are configured to receive the spatial information via a sidelink broadcast message.

11. The apparatus of claim 1, wherein to transmit the one or more sidelink reference signals, the at least one processor is further configured to:
transmit the one or more sidelink reference signals in a range of beam directions during a time in which the at least one RIS is activated.

12. The apparatus of claim 1, wherein the at least one processor is further configured to:
transmit, to the second UE, a request for the at least one RIS to be activated.

13. The apparatus of claim 12, wherein the memory and the at least one processor are further configured to:
receive, from the second UE, a second indication of resources for transmitting the one or more sidelink reference signals, wherein the memory and the at least one processor are configured to transmit the one or more sidelink reference signals based on the second indication of resources.

14. The apparatus of claim 1, wherein the memory and the at least one processor are further configured to:
indicate, to the second UE, a time in which the one or more sidelink reference signals are to be transmitted by the first UE, and transmit the one or more sidelink reference signals to the at least one RIS based on the time indicated.

15. The apparatus of claim 1, wherein the memory and the at least one processor are configured to transmit the one or more sidelink reference signals to the at least one RIS based on the first UE and the at least one RIS being line-of-sight (LOS).

16. The apparatus of claim 1, wherein the memory and the at least one processor are configured to receive the one or more reflected sidelink reference signals via a first reflected path, a strongest reflected path, or a path with a channel impulse response (CIR) exceeding a threshold from the at least one RIS.

17. The apparatus of claim 1, wherein the at least one processor is further configured to:
measure clutter echo associated with the one or more sidelink reference signals if the one or more sidelink reference signals are transmitted to the at least one RIS in a duration in which the at least one RIS is not activated, and wherein the one or more reflected sidelink reference signals are received with the measured clutter echo taken into consideration.

18. The apparatus of claim 1, further comprising a transceiver coupled to the at least one processor.

19. A method of wireless communication at a first user equipment (UE), comprising:
receiving, from a second UE, an indication that the second UE is associated with at least one reconfigurable intelligent surface (RIS);
transmitting one or more sidelink reference signals to the at least one RIS associated with the second UE;
receiving one or more reflected sidelink reference signals reflected from the at least one RIS; and
calculating a signal round-trip time (RTT) based on the one or more sidelink reference signals and the one or more reflected sidelink reference signals.

20. An apparatus for wireless communication at a second UE, comprising:
a memory; and
at least one processor coupled to the memory and configured to:
transmit, to a first UE, an indication that the second UE is associated with at least one reconfigurable intelligent surface (RIS) and information indicating a time, a duration, or a periodicity in which the at least one RIS is to be activated; and
activate the at least one RIS based on the information.

21. The apparatus of claim 20, wherein to transmit the indication and the information, the memory and the at least one processor are configured to:
transmit the indication via a first message; and
transmit the information via a second message.

22. The apparatus of claim 20, wherein the at least one processor is further configured to:
configure the at least one RIS with one or more precoding weights or beam directions for at least one of incident signals or reflected signals.

23. The apparatus of claim 22, wherein the memory and the at least one processor are configured to configure a same precoding weight or a same beam direction for the at least one of the incident signals or the reflected signals across multiple time slots.

24. The apparatus of claim 22, wherein the memory and the at least one processor are configured to configure different precoding weights or different beam directions for the at least one of the incident signals or the reflected signals across different time slots.

25. The apparatus of claim 20, wherein the memory and the at least one processor are further configured to:
transmit, to the first UE, spatial information associated with the at least one RIS.

26. The apparatus of claim 25, wherein the spatial information includes at least one of a first precoding weight for an incident signal, a first beam direction for the incident signal, a second precoding weight for a reflected signal, or a second beam direction for the reflected signal.

27. The apparatus of claim 20, wherein the memory and the at least one processor are further configured to:
receive, from the first UE, a request to activate the at least one RIS, and wherein the at least one RIS is activated by the second UE based at least in part on the request.

28. The apparatus of claim 20, wherein the memory and the at least one processor are further configured to:
receive, from the first UE, a second indication indicating an additional time in which one or more sidelink reference signals are to be transmitted by the first UE, and wherein the at least one RIS is activated by the second UE based at least in part on the second indication.

29. The apparatus of claim 20, further comprising a transceiver coupled to the at least one processor.

30. A method of wireless communication at a second user equipment (UE), comprising:
transmitting, to a first UE, an indication that the second UE is associated with at least one reconfigurable intelligent surface (RIS) and information indicating a time, a duration, or a periodicity in which the at least one RIS is to be activated; and
activating the at least one RIS based on the information.

\* \* \* \* \*